(12) United States Patent
Nguyen et al.

(10) Patent No.: US 11,242,134 B1
(45) Date of Patent: Feb. 8, 2022

(54) REAL-TIME DRAG OPTIMIZATION CONTROL FRAMEWORK

(71) Applicant: United States of America as Represented by the Administrator of the NASA, Washington, DC (US)

(72) Inventors: Nhan Thanh Nguyen, Santa Clara, CA (US); Eric Bi-Wen Ting, Los Altos, CA (US)

(73) Assignee: United States of America as Represented by the Administrator of NASA, Washington, DC (US)

(*) Notice: Subject to any disclaimer, the term of this patent is extended or adjusted under 35 U.S.C. 154(b) by 586 days.

(21) Appl. No.: 15/986,794

(22) Filed: May 22, 2018

Related U.S. Application Data

(60) Provisional application No. 62/510,151, filed on May 23, 2017.

(51) Int. Cl.
| | | |
|---|---|---|
| *G01C 23/00* | (2006.01) | |
| *G05D 1/00* | (2006.01) | |
| *G05D 3/00* | (2006.01) | |
| *G06F 7/00* | (2006.01) | |
| *G06F 17/00* | (2019.01) | |
| *B64C 13/18* | (2006.01) | |
| *B64F 5/60* | (2017.01) | |
| *B64C 9/06* | (2006.01) | |

(52) U.S. Cl.
CPC ............... *B64C 13/18* (2013.01); *B64C 9/06* (2013.01); *B64F 5/60* (2017.01)

(58) Field of Classification Search
CPC .......... B64C 13/18; B64C 9/06; B64C 13/16; B64C 3/48; B64F 5/60
See application file for complete search history.

(56) References Cited

U.S. PATENT DOCUMENTS

| | | | | |
|---|---|---|---|---|
| 5,875,998 A | * | 3/1999 | Gleine | B64C 3/48 244/195 |
| 7,004,428 B2 | * | 2/2006 | Tracy | B64C 9/18 244/35 R |
| 9,227,721 B1 | * | 1/2016 | Nguyen | B64C 3/14 |
| 2008/0149779 A1 | * | 6/2008 | Phillips | B64C 3/52 244/201 |
| 2017/0329350 A1 | * | 11/2017 | Millman | B64C 13/18 |

* cited by examiner

*Primary Examiner* — Harry Y Oh
(74) *Attorney, Agent, or Firm* — Rhys W. Cheung; Robert M. Padilla; Helen M. Galus

(57) ABSTRACT

Processes for real-time drag optimization control for aeroelastic wing structures are disclosed. Adaptive reconfiguration of aircraft control surfaces by an online real-time drag optimization control approach to reduce or minimize drag may reduce the amount of fuel that is consumed by the aircraft during flight. The input data may be obtained from sensor information pertaining to the wing deflection and aircraft state information. The optimization approach may compute an optimal solution of the distributed flight control surface deflections that are integrated in a flight path angle flight control system.

20 Claims, 13 Drawing Sheets

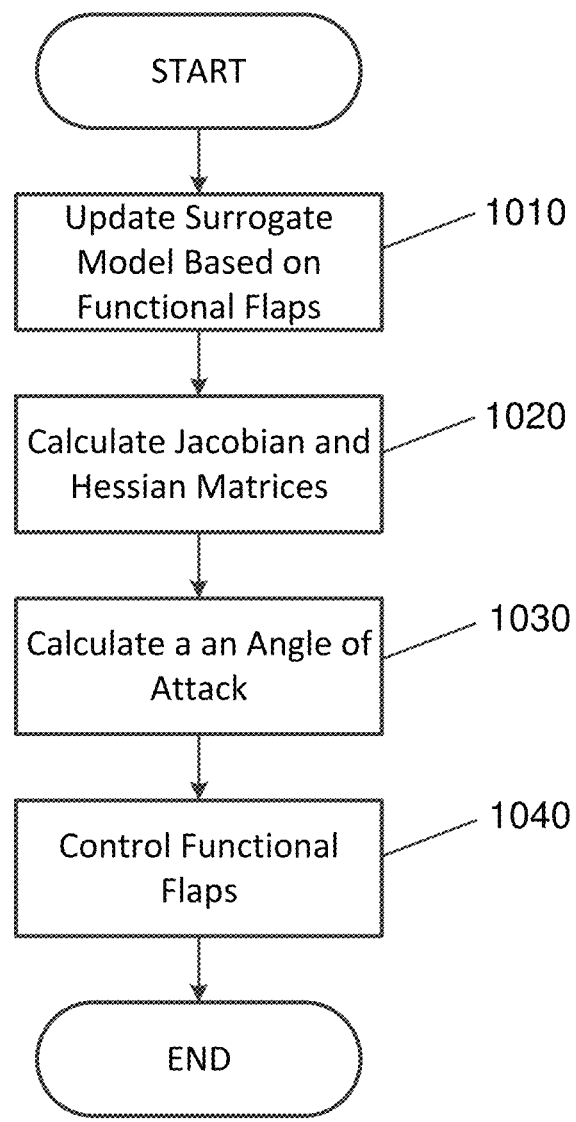

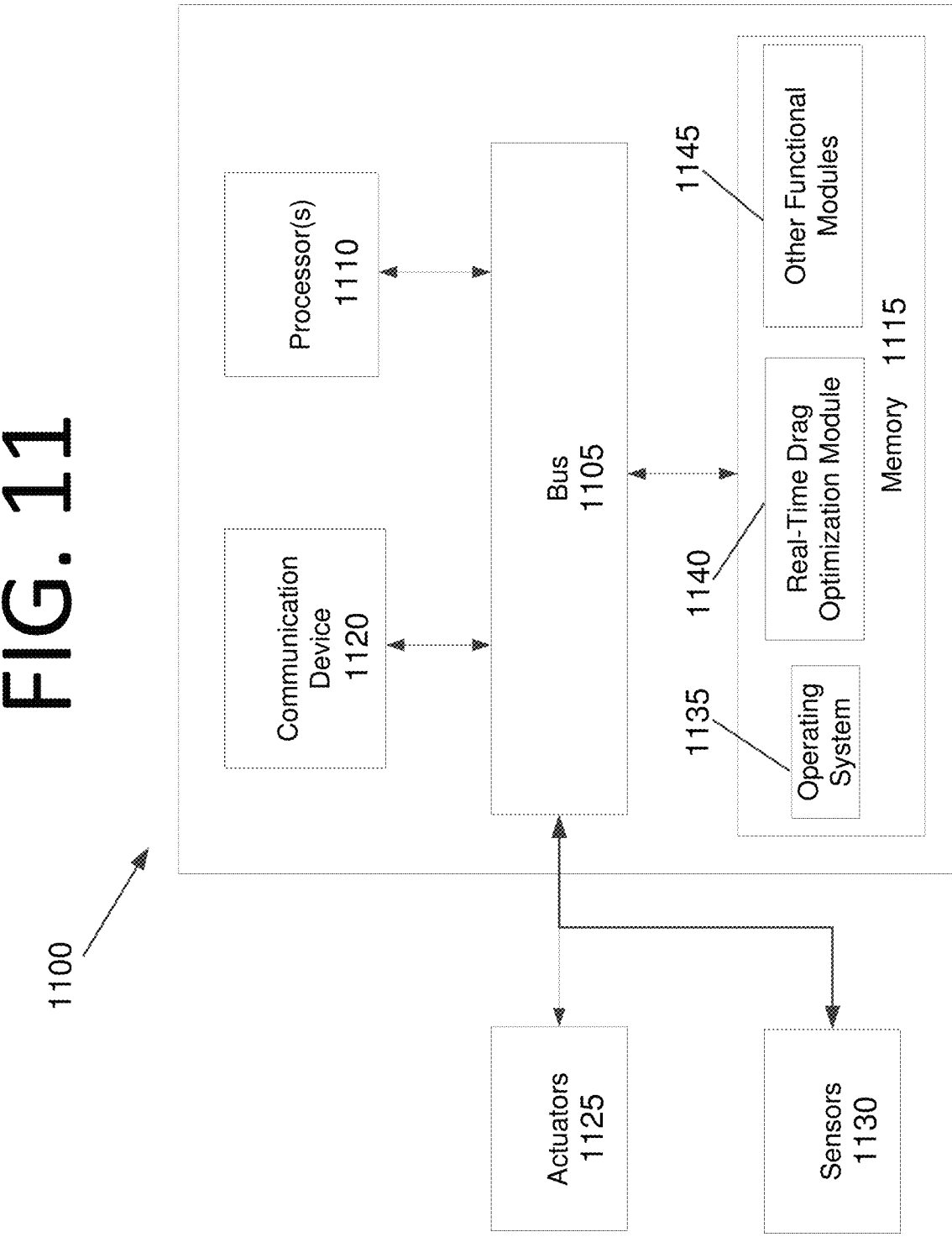

REAL-TIME DRAG OPTIMIZATION CONTROL FRAMEWORK

CROSS-REFERENCE TO RELATED APPLICATION

This application claims the benefit of U.S. Provisional Patent Application No. 62/510,151 filed May 23, 2017. The subject matter of this earlier filed application is hereby incorporated by reference in its entirety.

ORIGIN OF THE INVENTION

The invention described herein was made by employees of the United States Government and may be manufactured and used by or for the Government of the United States of America for governmental purposes without the payment of any royalties thereon or therefore.

FIELD

The present invention generally pertains to drag optimization, and more particularly, to a real-time drag optimization control framework.

BACKGROUND

Future transport aircraft will likely employ adaptive wing technologies that enable the wings of those aircraft to adaptively reconfigure themselves into more optimal shapes for improved aerodynamic efficiency throughout the flight envelope. The desire for adaptive wing technologies is driven by the cost of fuel consumption in commercial aviation, which ranged as high as $50 billion in annual cost globally in 2012 according to the Bureau of Transportation Statistics. Aircraft wings are often designed to be optimal in aerodynamic performance at a single point in the flight envelope. This point is called a "design point." As the aircraft cruises at different points in the flight envelope other than the design point, the aircraft is at off-design performance, and the aerodynamic efficiency tends to degrade. The extent of the off-design performance is based on the proximity of the off-design flight conditions from the design point and the wing structures.

Adaptive wing technologies often employ flight control surfaces in a strategic manner to change the wing aerodynamic shapes continuously during flight. These flight control surfaces can be discrete, such as an aileron, distributed, such as multiple flaps that span the wing, or both. Each flap can be plain, such as the aileron, or of variable camber. For example, NASA Ames has developed one such adaptive wing technology concept called Variable Camber Continuous Trailing Edge Flap (VCCTEF), which is a distributed variable camber flap system.

Modern aircraft also control their flaps to improve performance. For example, the Boeing 787 Dreamliner® employs Trailing Edge Variable Camber (TEVC) technology for real-time cruise drag optimization. The Airbus A350 XWB employs Adaptive Drooped Hinge Flap (ADHF) technology for the same purpose. The promise of adaptive wing technologies that are bio-inspired by birds has been long recognized, but to date, the implementation of such adaptive wing technologies has not been fully realized.

Aircraft designers often conduct extensive off-line optimization using analytical models to determine the optimal configurations of the aircraft at different points in the flight envelope. These off-line solutions are organized in a table lookup format as a function of aircraft performance parameters that the designers can retrieve in-flight to command the wings to change their shapes. A disadvantage of this conventional approach is that the adaptive reconfiguration is specific to a particular aircraft mathematical model with specific performance parameters, such as gross weight operating at a particular flight condition. This aircraft model may represent an average aircraft performance for a notional aircraft, but not an actual aircraft. As the aircraft configurations, performance parameters, and in-flight conditions can vary widely from one aircraft to another, these variations render the table lookup method less effective and non-adaptive to changing nature of the operating aircraft. Accordingly, an improved approach to drag optimization may be beneficial.

SUMMARY

Certain embodiments of the present invention may provide solutions to the problems and needs in the art that have not yet been fully identified, appreciated, or solved by conventional drag optimization technologies. For example, some embodiments of the present invention pertain to a real-time drag optimization control framework that does not rely on a single point in the flight envelope, or for aeroelastic aircraft with distributed flap systems. In particular, some embodiments of the present invention address the need for real-time drag optimization in connection to aeroelastic compensation for aircraft equipped with substantially flexible wings.

In an embodiment, a computer-implemented aerodynamic optimization method includes perturbing a plurality of flap sections of an aircraft using excitation signals generated by an excitation signal generator via a sweep method or a random excitation method, by a computing system. The computer-implemented method also includes detecting changes in drag, lift, pitching moment, wing aeroelastic bending deflection and twist, or any combination thereof, by the computing system, that were generated by the flap section perturbations via at least one sensor. The computer-implemented method further includes performing online model identification, by the computing system.

In another embodiment, a system includes memory storing computer program code for performing aerodynamic optimization and at least one processor. The at least one processor, by executing the computer program code, is configured to perturb a plurality of flap sections of an aircraft using excitation signals generated by an excitation signal generator via a sweep method or a random excitation method. The at least one processor is also configured to detect changes in drag, lift, pitching moment, wing aeroelastic bending deflection and twist, or any combination thereof, that were generated by the flap section perturbations via at least one sensor. The at least one processor is further configured to perform online model identification and control flight control surfaces of the aircraft based on the converged model, by the computing system, to improve aerodynamic performance during flight.

In yet another embodiment, a computer program is embodied on a non-transitory computer-readable storage medium. The program is configured to cause at least one processor to receive excitation signals generated by an excitation signal generator and signals from at least one sensor pertaining to aerodynamic effects of flap section perturbations of flap sections of an aircraft. The program is also configured to cause the at least one processor to compute surrogate aerodynamic models for aircraft lift, drag, and pitching moment as functions of an aircraft angle of attack, actual or virtual control variables of the flap sections, wing bending deflection, and twist at a wing tip using a direct or an indirect method. The computer program is further configured to cause the at least one processor to update an estimated model based on the computed surrogate aerodynamic models and repeat the receiving, computing, and updating over a plurality of cycles until a truth model and the estimated model converge, yielding a converged model.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 10 is a flowchart illustrating a process for accounting for flap failure, according to an embodiment of the present invention.

FIG. 11 is a block diagram illustrating a computing system configured to perform real-time drag optimization control for aeroelastic wing structures, according to an embodiment of the present invention.

DETAILED DESCRIPTION OF THE EMBODIMENTS

Figure 1:
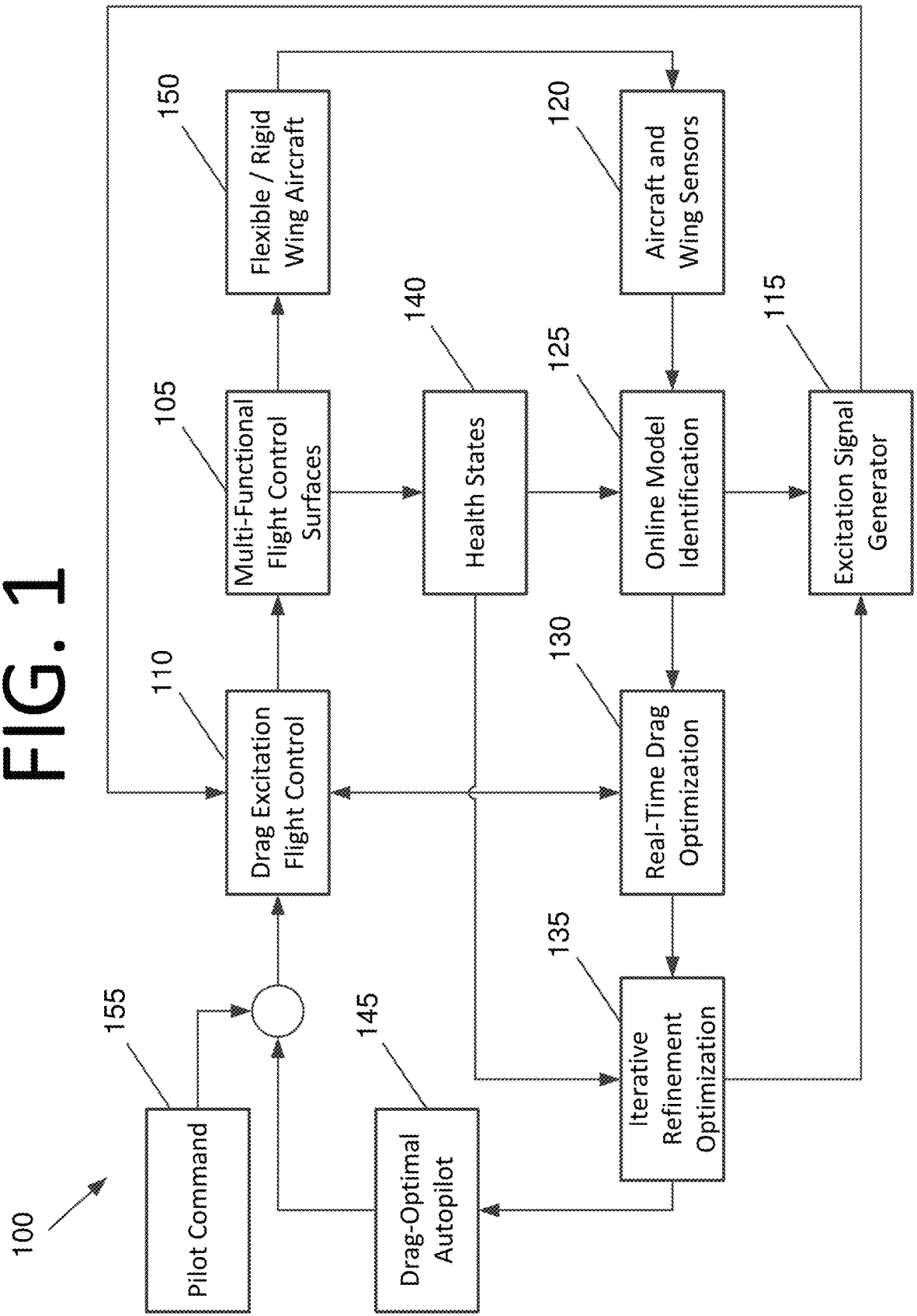
FIG. 1 illustrates a real-time drag optimization control framework, according to an embodiment of the present invention.

Some embodiments of the present invention pertain to a real-time drag optimization control framework that does not rely on a single point in the flight envelope. When developing aircraft, manufacturers such as Boeing© conduct rigorous testing and develop complex models of the aircraft. These estimated aerodynamic models provide an approximation of aircraft performance, but these models exist in a computer only and are not exact models of the production airplane. Also, while manufactured with relatively precise manufacturing tolerances, production variances exist between aircraft. In other words, no two production aircraft are exactly alike. Furthermore, aircraft characteristics will change during the service life of the plane, which may be 20,000 to 30,000 hours of flight time or more (or in some cases, potentially less based on aircraft maintenance, modifications, and/or upgrades).

Accordingly, some embodiments start with the estimated aerodynamic model, produce a truth model that models the actual aircraft, and update the estimated model over a number of cycles until the two models converge within a certain tolerance. Boeing©, for instance, has a large amount of information on each plane and how it will behave. This a priori aerodynamic model information provides information within a certain uncertainty bound. However, flight conditions and aircraft performance may change based on altitude, airspeed, the number of passengers and cargo, the locations of passengers and other loading in the plane, etc.

When starting with an estimated model that can be used in conjunction with sensor signals and flap inputs to build real-time drag inputs, refining such a model would take less time. Indeed, where an accurate estimated model is provided, only a few flap excitation cycles may be needed to achieve convergence. Excitation provided in accordance with sweep methods or random excitation methods mildly perturbs the flaps. The changes in drag, lift, and pitch moment are sent to the system. Model estimation is performed, and this model is then used for drag optimization control.

This may take on the order of 5-10 minutes in some embodiments to obtain a new model within the convergence tolerance. The configuration of the flaps may then be changed in accordance with the new model. However, in cases where there is not an accurate model of the aircraft, it may take longer to obtain an accurate model of the actual aircraft performance. The process of estimating new aerodynamic models is called "online model identification" herein.

When online model identification is performed, this may be performed for some initial sets of flight conditions. After a while (e.g., after the aircraft has performed a sufficient number of flights during its service life), a relatively large number of aircraft models will have been built that are a function of altitude, airspeed, gross weight, etc. in some embodiments. For instance, after 1,000 hours of aircraft operation, it may be assumed that sufficient models have been generated for the aircraft under a wide range of operating conditions such that the models of the aircraft are accurately representative of the airplane under most operating conditions. It may be necessary, from time to time, to repeat the online model identification after a certain time interval to update the online models due to aircraft duty cycles to account for aircraft aging.

Once accurate models are built under various flight conditions and the parameters generally converge, the step of online model identification may be bypassed and the already generated models may be used to control the flaps based on airspeed, altitude, fuel weight, passenger/cargo loading, etc.

Online model estimate may also be run again if no model seems to fit a given rarely occurring situation (e.g., very few passengers are on a flight).

As the modern aircraft wing structures become more flexible due to the use of the composite material in the construction and high aspect ratio wing design, the aerodynamic performance of those aircraft wings can vary significantly over the flight envelope, and adverse aerodynamics can result from aeroelastic deflections. Increased drag, and hence, more fuel burn, is one such potential consequence. Without a mechanism for aeroelastic compensation, the benefit of weight reduction from the use of lightweight material could be reduced or negated by suboptimal aerodynamic performance under off-design flight conditions. Accordingly, some embodiments model and account for the flexibility of the aircraft wing structure (i.e., "aeroelasticity").

A framework 100 of some embodiments is illustrated in FIG. 1. Framework 100 includes the following functionality: (1) multi-functional flight control surfaces 105; (2) a drag-excitation flight control system 110; (3) an excitation signal generator 115; (4) an aircraft and wing sensor system 120; (5) online model identification 125; (6) real-time drag optimization 130; (7) iterative refinement optimization 135; (8) a multi-functional flight control surface health state system 140; and/or (9) a drag-optimal autopilot 145. Framework 100 also accounts for whether the aircraft has rigid or flexible (i.e., aeroelastic) wings 150 and allows pilot commands 155 to modify the control surfaces.

Multi-Functional Flight Control Surfaces

Figure 2:
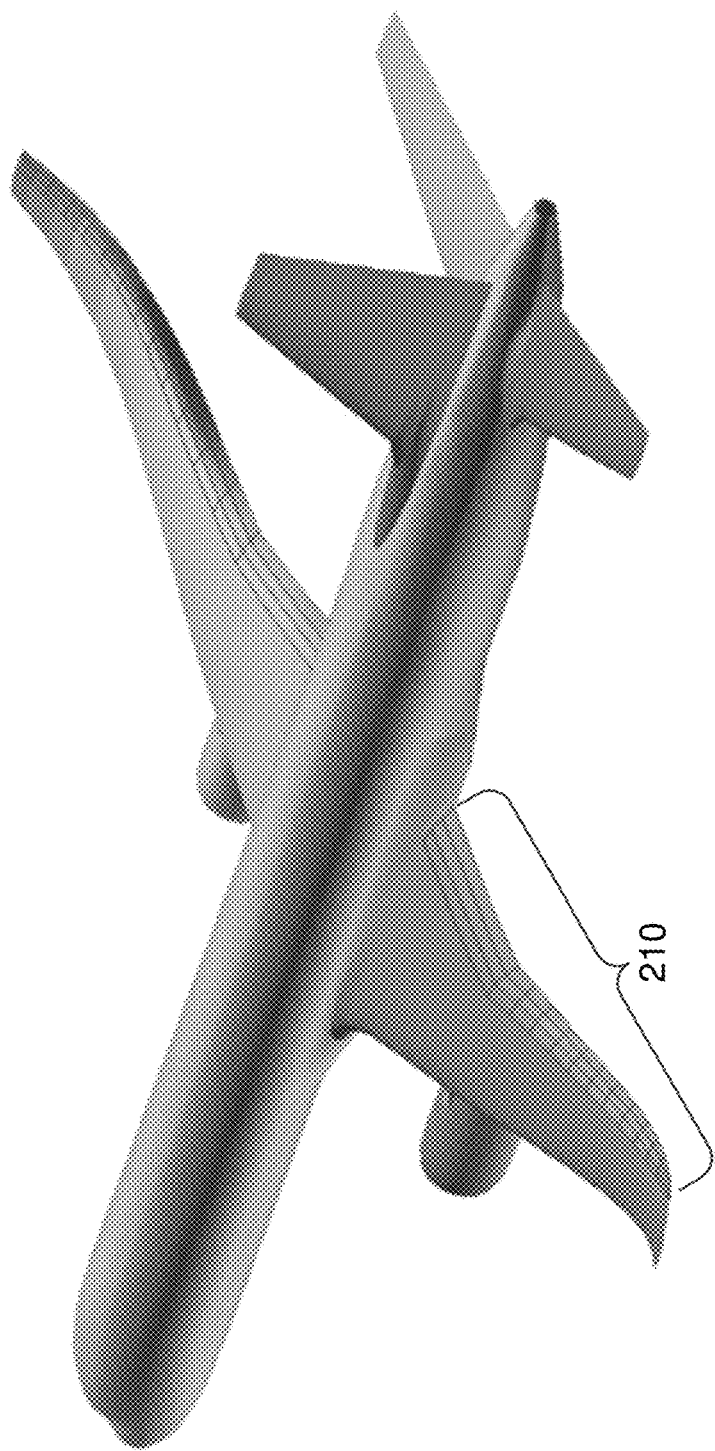
FIG. 2 illustrates a model of a flexible wing aircraft equipped with a VCCTEF system.

Aircraft that have flexible (aeroelastic) wings or "rigid" wings are equipped with multi-functional flight control surfaces on the wings. Such an aircraft 200 is shown in FIG. 2. The multi-functional flight control surfaces can be used for multiple functions including, but not limited to, drag optimization, roll control, pitch control, yaw control, and aeroservoelastic controls (e.g., gust load alleviation control). In some embodiments, only drag optimization, roll control, pitch control, and yaw control are relevant. It should be appreciated that these functions are not mutually inclusive in conjunction with the primary drag optimization function. For example, the flight control surfaces may provide a pure drag optimization function without requiring a yaw control function. The multi-functional flight control surfaces can be configured on the aircraft wings in a distributed fashion, whereby multiple flight control surfaces are located throughout the wings, as shown in FIG. 2. Alternatively, the multi-functional flight control surfaces can be configured in a discrete fashion, where individual flight control surfaces are located at one or more strategic locations on the wings, such as the ailerons in a conventional aircraft.

In addition to the multi-functional flight control surfaces, the aircraft is also equipped with conventional flight control surfaces. These include the ailerons for roll control, the elevator for pitch control, and the rudder for yaw control. Moreover, the aircraft is equipped with engines for providing thrust and airspeed control.

Drag-Excitation Flight Control System

The aircraft in embodiments of the present invention is equipped with a drag-excitation flight control system 110 of FIG. 1. The purpose of the drag-excitation flight control system 110 is to provide excitation command signals for drag estimation to the multi-functional flight control surfaces while maintaining control during the excitation of the aircraft airspeed, altitude, flight path angle, angle of attack, or heading angle using the conventional flight control surfaces such as the elevator, or the rudder and the ailerons, and the engines. The approach for performing drag-excitation flight control 110 in some embodiments is described in Section IV of U.S. Provisional Patent Application No. 62/510,151. This section describes implementation of optimal flight control by means of (but not limited to) a linear-quadratic regulator (LQR) to provide an altitude-hold mode during the drag minimization algorithm simulation. This provides a zero flight path angle command or flight path angle regulator flight control design for a flexible wing aircraft that provides excitation command signals for drag estimation.

The flight path angle command mode is used to trim the aircraft at a desired cruise altitude. This flight path angle command mode maintains the aircraft at flight level to minimize aircraft motion for improved ride quality. Furthermore, the airspeed is regulated by setting the engine thrust equal to drag to ensure the aircraft maintains a constant Mach number. This may be implemented not only for passenger comfort, but also due to the fact that a constant Mach number is an assumption in the drag minimization algorithm of some embodiments. To account for Mach number variation, various online models could be constructed from the online model identification 125. Then, these models could be appropriately utilized for real-time drag optimization control at any specified Mach numbers. It should be understood that other flight control modes could be designed for the drag-excitation flight control system 110, such as the angle of attack command mode.

One novel feature of the drag-excitation flight control system 110 of some embodiments is that it explicitly accounts for the aeroelastic interaction of the flexible wing with the aircraft (in flexible wing embodiments) through the wing deflection information described by the variables wt and $\theta_t$, which are the wing tip bending deflection and wing tip twist, respectively. These variables can come from wing aeroelastic sensors, as described in further detail below. Subsection C of Section IV of U.S. Provisional Patent Application No. 62/510,151 describes an aircraft model of a flexible wing aircraft that accounts for the wing deflection information.

More specifically, a coupled longitudinal flight dynamic and aeroservoelastic (ASE) model of an aircraft is developed. It includes the linear flight dynamic model, a linear aeroelastic model of the flexible wing structure, and a linear actuator model of the VCCTEF for the aeroelastic states.

The aeroelastic variables of some embodiments are defined in $$[M+M_a]\begin{bmatrix}\ddot{w}_t\\ \ddot{\theta}_t\end{bmatrix}+[C+C_a]\begin{bmatrix}\dot{w}_t\\ \dot{\theta}_t\end{bmatrix}+[K+K_a]\begin{bmatrix}w_t\\ \theta_t\end{bmatrix}=F_r x_r+F_\delta \delta \quad (1)$$

where wt is the wing tip bending deflection, $\theta_t$ is the torsional twist about the elastic axis, $x_r$ is the rigid-body aircraft state vector, $\delta$ is the flap deflection vector, K is the generalized structural stiffness matrix, $K_a$ is the aerodynamic stiffness matrix, C is the generalized structural damping matrix, $C_a$ is the aerodynamic damping matrix, M is the generalized structural mass matrix, $M_a$ is the aerodynamic mass matrix, and $F_r$ is the rigid-body aircraft force derivative defined in $$F_r = \frac{q_\infty \cos\Lambda}{V_\infty} \int_0^L \begin{bmatrix} 0 & 0 & V_\infty c C(k) c_{L_\alpha} \Phi^T(\bar{y}) & c^2\left(\frac{3}{4} + \frac{x_{LE}}{c}\right) C(k) c_{L_\alpha} \Phi^T(\bar{y}) & 0 \\ 0 & 0 & V_\infty c e C(k) c_{L_\alpha} \cos\Lambda \Psi^T(\bar{y}) & c^2\left(\frac{3}{4} + \frac{x_{LE}}{c}\right) \cos\Lambda c_{L_\alpha} \cos\Lambda \Psi^T(\bar{y}) & 0 \end{bmatrix} d\bar{y} \quad (2)$$

and $F_\delta$ is the flap force derivative defined in $$F_\delta = q_\infty \int_0^L \begin{bmatrix} \Phi^T(\bar{y}) c_{L_\delta} \cos\Lambda \\ \Psi^T(\bar{y}) \left(c_{m_\alpha} + \frac{e}{c} c_{L_\delta}\right) c^2 \cos^2\Lambda \end{bmatrix} d\bar{y} \quad (3)$$

where $c_{L_\delta}$ is the section lift coefficient sensitivity with respect to the flap deflection vector, $c_{m_\delta}$ is the section pitching moment coefficient sensitivity with respect to the flap deflection vector, c is the section chord length, $\bar{x}_{LE}$ is the location of the leading edge of the wing section relative to the aircraft center of gravity, e is the location of the elastic axis, $V_\infty$ is the aircraft airspeed, $q_\infty$ is the dynamic pressure, $\Lambda$ is wing sweep angle, $\Phi^T(\bar{y})$ is the bending mode shape matrix, $\Psi^T(\bar{y})$ is the torsional mode shape matrix, and $\bar{y}$ is the wing coordinate along the elastic axis.

The state vector for the rigid body aircraft $x_r$ is $$x_r = \begin{bmatrix} h \\ V \\ \alpha \\ q \\ \theta \end{bmatrix} \quad (4)$$

The flap deflection vector $\delta$ includes the individual flap deflections denoted by $\delta_{i,j}$, where i denotes the index of the flight control surface along the wing span, and j denotes the index of the flight control surface along the wing chord. For example, referring to FIG. 2, i=1, 2, . . . , $n_i$ where $n_i$=14 corresponds to the 14 flight control surfaces or flap sections along the wing span from the wing root to the wing tip, and j=1, 2, . . . , $n_j$ where $n_j$=3 corresponds to the three flap segments along the wing chord from the inner segment adjacent to the main wing to the outermost segment at the trailing edge.

In some embodiments, a new type of flap system called the Variable Camber Continuous Trailing Edge Flap (VCCTEF) is employed in an aircraft design for drag optimization. Each flap section of the VCCTEF includes three chordwise segments of varying or equal chord length, as shown in VCCTEF 300 of FIG. 3A. These three chordwise flap segments can be actuated individually in unison or in a coordinated fashion by a prescribed camber shape as described subsequently when a flap deflection command is given. By varying the deflections of the individual chordwise flap segments, any camber surface can be created to achieve a desired aerodynamic performance. In some embodiments with three flap segments along the wing chord, the segments are prescribed according to a circular-arc camber shape as follows:

$$\delta_{i,1} = \frac{1}{3}\delta_{i,3} \quad (5)$$

$$\delta_{i,2} = \frac{2}{3}\delta_{i,3}$$

Figure 3A:
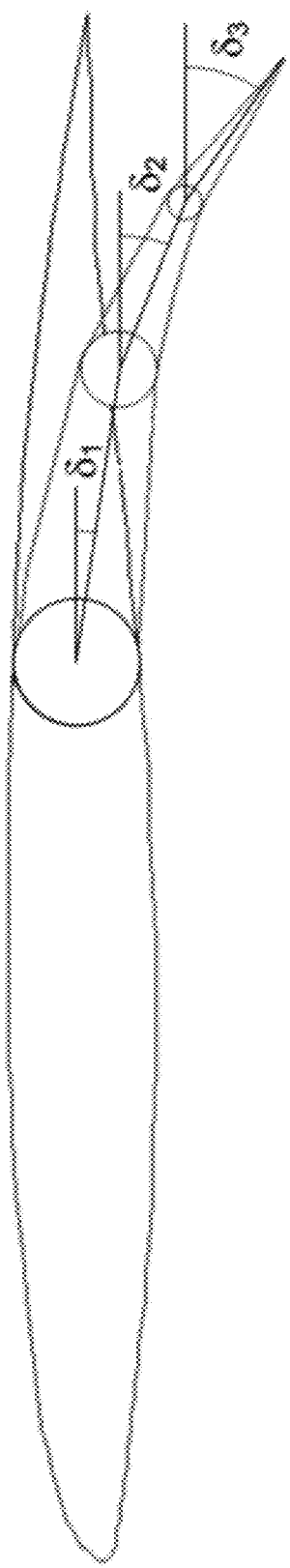
FIG. 3A illustrates a flap section of the VCCTEF having three cambered segments.

This relation allows the drag minimization algorithm of some embodiments to only consider the deflection angle of the third chordwise flap segment $\delta_{i,3}$ since the other two segments will follow accordingly. In a previous study, it was found that the circular-arc camber provides one of the best aerodynamic performances among the different camber configurations investigated using the OVERFLOW computational fluid dynamics (CFD) code. The deflection angle of each individual chordwise segment is measured relative to each hinge and the undeflected flap segment, as shown in FIG. 3A.

In other embodiments, the flap deflection vector $\delta$ may be conveniently parameterized by a mathematical shape function. This parameterization allows the deflections of multi-functional distributed flight control surfaces such as the VCCTEF to be mapped into a vector of virtual control variables a which are parameters of the shape function. For the purposes of a nonlimiting illustration only, one such shape function could be a $5^{th}$ degree Chebyshev polynomial which could be used to parameterize the deflections of multi-functional distributed flight control surfaces.

More specifically, in some embodiments, the spanwise flap sections are restricted in their movement due to structural properties of transition materials or the desire to maintain a gradual stepwise smooth variation in the flap deflections between adjoint flap sections. For example, to model the candidate optimal shape of the VCCTEF having individual spanwise flap sections; each with three chordwise flap segments, a parameterization of the flap deflections using a shape function in the form of a $5^{th}$ degree Chebyshev polynomial may be used and given by:

$$\delta_{i,3} = \sum_{n=0}^{N} a_n T_n(x_i) \quad (6)$$

where $a_n$ is the virtual control variable corresponding to the Chebyshev polynomial function $$T_n(x_i) \text{ with } T_0(x_i) = 1, T_1(x_i) = x_i, T_2(x_i) = 2x_i^2 - 1, \quad (7)$$

$$T_3(x_i) = 4x_i^3 - 3x_i, T_4(x_i) = 8x_i^4 - 8x_i^2 + 1, \text{ and}$$

$$T_5(x_i) = 16x_i^5 - 20x_i^3 + 5x_i \text{ and } x_i = \frac{y_i}{L}$$

with $y_i$ as the midpoint location of the $i^{th}$ flap section numbered from root to tip and L as the length of half a wing span. This parameterization results in six design variables for the drag minimization problem ($a_0, a_1, a_2, a_3, a_4, a_5$). It should be understood that the parameterization is not limited to only this specific shape function, as described subsequently.

Use of virtual control variables is an effective method for parameterizing the actual control signals for the multi-functional distributed flight control surfaces and reducing the number of control variables when the number of the multi-functional distributed flight control surfaces is large.

Accordingly, in some other embodiments, the aeroelastic variables are defined in $$[M+M_a]\begin{bmatrix}\ddot{w}_t\\ \ddot{\theta}_t\end{bmatrix}+[C+C_a]\begin{bmatrix}\dot{w}_t\\ \dot{\theta}_t\end{bmatrix}+[K+K_a]\begin{bmatrix}w_t\\ \theta_t\end{bmatrix}=F_r x_r+F_a a \quad (8)$$

where $F_a$ is the force derivative with respect to the virtual control variables defined in $$F_a = q_\infty \int_0^L \begin{bmatrix}\Phi^T(\bar{y})c_{L_a}\cos\Lambda\\ \Psi^T(\bar{y})\left(c_{m_a}+\frac{e}{c}c_{L_a}\right)c^2\cos^2\Lambda\end{bmatrix}d\bar{y} \quad (9)$$

where $c_{L_a}$ is the lift coefficient sensitivity, $c_{L_a}$ is the section lift coefficient sensitivity, and $c_{m_a}$ is the section pitching moment coefficient sensitivity with respect to the virtual control vector a.

In some embodiments that use the virtual control variables, the implementation of the aeroelastic variables defined in Eq. (8) into the linear state-space system results in the following model for the flight path angle command drag-excitation flight control system 110:

$$\begin{bmatrix}\Delta\dot{u}\\ \Delta\dot{\alpha}\\ \dot{q}\\ \Delta\dot{\theta}\\ \dot{x}_\gamma\\ \Delta\dot{w}_t\\ \Delta\dot{\theta}_t\\ \Delta\ddot{w}_t\\ \Delta\ddot{\theta}_t\end{bmatrix}= \quad (10)$$

$$\begin{bmatrix}X_u & X_\alpha & X_q & -g & 0 & X_{w_t} & X_{\theta_t} & X_{\dot{w}_t} & X_{\dot{\theta}_t}\\ Z_u & Z_\alpha & Z_q+\bar{V} & 0 & 0 & Z_{w_t} & Z_{\theta_t} & Z_{\dot{w}_t} & Z_{\dot{\theta}_t}\\ M_u & M_\alpha & M_q & 0 & 0 & M_{w_t} & M_{\theta_t} & M_{\dot{w}_t} & M_{\dot{\theta}_t}\\ 0 & 0 & 1 & 0 & 0 & 0 & 0 & 0 & 0\\ 0 & -1 & 0 & 1 & 0 & 0 & 0 & 0 & 0\\ 0 & 0 & 0 & 0 & 0 & 0 & 0 & 1 & 0\\ 0 & 0 & 0 & 0 & 0 & 0 & 0 & 0 & 1\\ F_{r11} & F_{r12} & F_{r13} & F_{r14} & F_{r15} & K_{r11} & K_{r12} & C_{r11} & C_{r12}\\ F_{r21} & F_{r22} & F_{r23} & F_{r24} & F_{r25} & K_{r21} & K_{r22} & C_{r21} & C_{r22}\end{bmatrix}$$

$$\begin{bmatrix}\Delta u\\ \Delta\alpha\\ q\\ \Delta\theta\\ x_\gamma\\ \Delta w_t\\ \Delta\theta_t\\ \Delta\dot{w}_t\\ \Delta\dot{\theta}_t\end{bmatrix}+\begin{bmatrix}X_{\delta_e}\\ Z_{\delta_e}\\ M_{\delta_e}\\ 0\\ 0\\ 0\\ 0\\ 0\\ 0\end{bmatrix}\Delta\delta_e+$$

$$\begin{bmatrix}X_{a_0} & X_{a_1} & X_{a_2} & X_{a_3} & X_{a_4} & X_{a_5}\\ Z_{a_0} & Z_{a_1} & Z_{a_2} & Z_{a_3} & Z_{a_4} & Z_{a_5}\\ M_{a_0} & M_{a_1} & M_{a_2} & M_{a_3} & M_{a_4} & M_{a_5}\\ 0 & 0 & 0 & 0 & 0 & 0\\ 0 & 0 & 0 & 0 & 0 & 0\\ 0 & 0 & 0 & 0 & 0 & 0\\ 0 & 0 & 0 & 0 & 0 & 0\\ F_{a_{10}} & F_{a_{11}} & F_{a_{12}} & F_{a_{13}} & F_{a_{14}} & F_{a_{15}}\\ F_{a_{20}} & F_{a_{21}} & F_{a_{22}} & F_{a_{23}} & F_{a_{24}} & F_{a_{25}}\end{bmatrix}\begin{bmatrix}a_0\\ a_1\\ a_2\\ a_3\\ a_4\\ a_5\end{bmatrix}+\begin{bmatrix}0\\ 0\\ 0\\ 0\\ -\gamma_c\\ 0\\ 0\\ 0\\ 0\end{bmatrix}$$

where $\Delta u$ is the incremental forward airspeed, $\Delta\alpha$ is the incremental angle of attack, q is the pitch rate about the aircraft center of gravity (CG), $\Delta\theta$ is the incremental pitch angle, $x_\gamma$ is the integral tracking error, $\Delta w_t$ is the incremental wing tip bending deflection, $\Delta\theta_t$ is the incremental wing tip torsional twist, $\Delta\dot{w}_t$ is the wing tip bending deflection rate, $\Delta\dot{\theta}_t$ is the wing tip torsional twist rate, and $\gamma_c$ is the flight path angle command, with $$F_{r_{ij}}=\{(M+M_a)^{-1}F_r\}_{ij},\ i=1,2\ j=1,2,3,4,5 \quad (11)$$

$$K_{r_{ij}}=\{-(M+M_a)^{-1}(K+K_a)\}_{ij},\ i=1,2\ j=1,2 \quad (12)$$

$$C_{r_{ij}}=\{-(M+M_a)^{-1}(C+C_a)\}_{ij},\ i=1,2\ j=1,2 \quad (13)$$

$$F_{a_{ij}}=\{(M+M_a)^{-1}F_a\}_{ij},\ i=1,2\ j=0,1,2,3,4,5 \quad (14)$$

In some embodiments, the angle of attack command drag-excitation flight control system 110 could be designed by conveniently replacing the flight path angle command ye with the angle of attack command ac in Eq. (10).

For the drag-excitation flight control system 110 with real-time drag minimization, the virtual control variables $a_0 \ldots$ s formed by the $5^{th}$ degree Chebyshev polynomial shape function are prescribed as a command vector instead of an input vector. The commands $a_i(t)$, i=1, 2, . . . , N are prescribed as functions of time for the online model identification 125.

It should be understood that the parameterization of the flap deflections could also be performed using any other shape functions beside the $5^{th}$ degree Chebyshev polynomial shape function.

In some other embodiments, it may be more convenient to use the actual flap deflection vector δ than the virtual control vector a. Then, the fight path angle command drag excitation system with accounting for aeroelasticity can be designed using the following state-space model:

$$\begin{bmatrix} \Delta \dot{u} \\ \Delta \dot{\alpha} \\ \dot{q} \\ \Delta \dot{\theta} \\ \dot{x}_\gamma \\ \Delta \dot{w}_t \\ \Delta \dot{\theta}_t \\ \Delta \ddot{w}_t \\ \Delta \ddot{\theta}_t \end{bmatrix} = \tag{15}$$

$$\begin{bmatrix} X_u & X_\alpha & X_q & -g & 0 & X_{w_t} & X_{\theta_t} & X_{\dot{w}_t} & X_{\dot{\theta}_t} \\ Z_u & Z_\alpha & Z_q+V & 0 & 0 & Z_{w_t} & Z_{\theta_t} & Z_{\dot{w}_t} & Z_{\dot{\theta}_t} \\ M_u & M_\alpha & M_q & 0 & 0 & M_{w_t} & M_{\theta_t} & M_{\dot{w}_t} & M_{\dot{\theta}_t} \\ 0 & 0 & 1 & 0 & 0 & 0 & 0 & 0 & 0 \\ 0 & -1 & 0 & 1 & 0 & 0 & 0 & 0 & 0 \\ 0 & 0 & 0 & 0 & 0 & 0 & 0 & 1 & 0 \\ 0 & 0 & 0 & 0 & 0 & 0 & 0 & 0 & 1 \\ F_{r_{11}} & F_{r_{12}} & F_{r_{13}} & F_{r_{14}} & F_{r_{15}} & K_{r_{11}} & K_{r_{12}} & C_{r_{11}} & C_{r_{12}} \\ F_{r_{21}} & F_{r_{22}} & F_{r_{23}} & F_{r_{24}} & F_{r_{25}} & K_{r_{21}} & K_{r_{22}} & C_{r_{21}} & C_{r_{22}} \end{bmatrix} \begin{bmatrix} \Delta u \\ \Delta \alpha \\ q \\ \Delta \theta \\ x_\gamma \\ \Delta w_t \\ \Delta \theta_t \\ \Delta \dot{w}_t \\ \Delta \dot{\theta}_t \end{bmatrix} + \begin{bmatrix} X_{\delta_e} \\ Z_{\delta_e} \\ M_{\delta_e} \\ 0 \\ 0 \\ 0 \\ 0 \\ 0 \\ 0 \end{bmatrix} \Delta \delta_e + \begin{bmatrix} X_\delta \\ Z_\delta \\ M_\delta \\ 0 \\ 0 \\ 0 \\ 0 \\ F_{\delta_1} \\ F_{\delta_2} \end{bmatrix} \delta + \begin{bmatrix} 0 \\ 0 \\ 0 \\ 0 \\ -\gamma_c \\ 0 \\ 0 \\ 0 \\ 0 \end{bmatrix}$$

with $$F_{\delta_i} = \{(M+M_a)^{-1} F_\delta\}_i, \quad i=1,2 \tag{16}$$

It should be understood that the use of the actual flap deflection vector $\delta$ or the virtual control vector a is entirely interchangeable depending on a particular advantageous design of a real-time drag optimization control system.

In some embodiments, the drag-excitation flight control system 110 could be designed using only aircraft state information without explicitly accounting for the wing deflection information by eliminating the dependency on the wing deflection variables $w_t$, $\theta_t$, $\dot{w}_t$, and $\dot{\theta}_t$ in the drag-excitation flight control design. This is described in Subsection B of Section IV of U.S. Provisional Patent Application No. 62/510,151. The state-space model can be simplified as $$\begin{bmatrix} \Delta \dot{u} \\ \Delta \dot{\alpha} \\ \dot{q} \\ \Delta \dot{\theta} \\ \dot{x}_\gamma \end{bmatrix} = \begin{bmatrix} X_u & X_\alpha & X_q & -g & 0 \\ Z_u & Z_\alpha & Z_q+V & 0 & 0 \\ M_u & M_\alpha & M_q & 0 & 0 \\ 0 & 0 & 1 & 0 & 0 \\ 0 & -1 & 0 & 1 & 0 \end{bmatrix} \begin{bmatrix} \Delta u \\ \Delta \alpha \\ q \\ \Delta \theta \\ x_\gamma \end{bmatrix} + \begin{bmatrix} X_{\delta_e} \\ Z_{\delta_e} \\ M_{\delta_e} \\ 0 \\ 0 \end{bmatrix} \Delta \delta_e + \tag{17}$$

$$\begin{bmatrix} X_{a_0} & X_{a_1} & X_{a_2} & X_{a_3} & X_{a_4} & X_{a_5} \\ Z_{a_0} & Z_{a_1} & Z_{a_2} & Z_{a_3} & Z_{a_4} & Z_{a_5} \\ M_{a_0} & M_{a_1} & M_{a_2} & M_{a_3} & M_{a_4} & M_{a_5} \\ 0 & 0 & 0 & 0 & 0 & 0 \\ 0 & 0 & 0 & 0 & 0 & 0 \end{bmatrix} \begin{bmatrix} a_0 \\ a_1 \\ a_2 \\ a_3 \\ a_4 \\ a_5 \end{bmatrix} + \begin{bmatrix} 0 \\ 0 \\ 0 \\ 0 \\ -\gamma_c \end{bmatrix}$$

Another novel feature of the drag-excitation flight control system 110 of some embodiments is that it provides explicit feedforward command signals, which include the excitation command signals to the multi-functional flight control surfaces 105. The state space model from Eq. (10) can be written in the form $$\dot{x} = Ax + Bu + z \tag{18}$$

which results in $$\begin{bmatrix} \Delta \dot{u} \\ \Delta \dot{\alpha} \\ \dot{q} \\ \Delta \dot{\theta} \\ \dot{x}_\gamma \\ \Delta \dot{w}_t \\ \Delta \dot{\theta}_t \\ \Delta \ddot{w}_t \\ \Delta \ddot{\theta}_t \end{bmatrix} = \tag{19}$$

$$\begin{bmatrix} X_u & X_\alpha & X_q & -g & 0 & X_{w_t} & X_{\theta_t} & X_{\dot{w}_t} & X_{\dot{\theta}_t} \\ Z_u & Z_\alpha & Z_q+V & 0 & 0 & Z_{w_t} & Z_{\theta_t} & Z_{\dot{w}_t} & Z_{\dot{\theta}_t} \\ M_u & M_\alpha & M_q & 0 & 0 & M_{w_t} & M_{\theta_t} & M_{\dot{w}_t} & M_{\dot{\theta}_t} \\ 0 & 0 & 1 & 0 & 0 & 0 & 0 & 0 & 0 \\ 0 & -1 & 0 & 1 & 0 & 0 & 0 & 0 & 0 \\ 0 & 0 & 0 & 0 & 0 & 0 & 0 & 1 & 0 \\ 0 & 0 & 0 & 0 & 0 & 0 & 0 & 0 & 1 \\ F_{r_{11}} & F_{r_{12}} & F_{r_{13}} & F_{r_{14}} & F_{r_{15}} & K_{r_{11}} & K_{r_{12}} & C_{r_{11}} & C_{r_{12}} \\ F_{r_{21}} & F_{r_{22}} & F_{r_{23}} & F_{r_{24}} & F_{r_{25}} & K_{r_{21}} & K_{r_{22}} & C_{r_{21}} & C_{r_{22}} \end{bmatrix}$$

$$\begin{bmatrix} \Delta u \\ \Delta \alpha \\ q \\ \Delta \theta \\ x_\gamma \\ \Delta w_t \\ \Delta \theta_t \\ \Delta \dot{w}_t \\ \Delta \dot{\theta}_t \end{bmatrix} + \begin{bmatrix} X_{\delta_e} \\ Z_{\delta_e} \\ M_{\delta_e} \\ 0 \\ 0 \\ 0 \\ 0 \\ 0 \\ 0 \end{bmatrix} \Delta \delta_e +$$

-continued $$\begin{bmatrix} X_{a_0}a_0 + X_{a_1}a_1 + X_{a_2}a_2 + X_{a_3}a_3 + X_{a_4}a_4 + X_{a_5}a_5 \\ Z_{a_0}a_0 + Z_{a_1}a_1 + Z_{a_2}a_2 + Z_{a_3}a_3 + Z_{a_4}a_4 + Z_{a_5}a_5 \\ M_{a_0}a_0 + M_{a_1}a_1 + M_{a_2}a_2 + M_{a_3}a_3 + M_{a_4}a_4 + M_{a_5}a_5 \\ 0 \\ -\gamma_c \\ 0 \\ 0 \\ F_{a_{10}}a_0 + F_{a_{11}}a_1 + F_{a_{12}}a_2 + F_{a_{13}}a_3 + F_{a_{14}}a_4 + F_{a_{15}}a_5 \\ F_{a_{20}}a_0 + F_{a_{21}}a_1 + F_{a_{22}}a_2 + F_{a_{23}}a_3 + F_{a_{24}}a_4 + F_{a_{25}}a_5 \end{bmatrix}$$

where the feedforward command signals are described by the variable z in Eq. (18) and are equal to the last column in Eq. (19), which contains the excitation command signals described by the variables $a_n$, n=1, 2, . . . , 5 where $a_n$ are the so-called virtual control variables obtained from a chosen mathematical shape function, such as that described in Section II of U.S. Provisional Patent Application No. 62/510,151.

In certain embodiments, the actual control signals are used in lieu of the virtual control variables. This approach may be employed for multifunctional discrete flight control surfaces that cannot be readily parameterized by a mathematical shape function, for example, such as a two discrete flap system on a wing, with one at the wing root and the other at the wing tip. This can be accomplished by replacing the virtual control variables $a_n$ with the actual control vector δ, as shown in Subsection A of Section IV of U.S. Provisional Patent Application No. 62/510,151. For example, the state-space model using the virtual control variables described by Eq. (17) is alternatively given by using the actual control vector δ:

$$\begin{bmatrix} \Delta \dot{u} \\ \Delta \dot{\alpha} \\ \dot{q} \\ \Delta \dot{\theta} \\ \dot{x}_y \end{bmatrix} = \begin{bmatrix} X_u & X_\alpha & X_q & -g & 0 \\ Z_u & Z_\alpha & Z_q + V & 0 & 0 \\ M_u & M_\alpha & M_q & 0 & 0 \\ 0 & 0 & 1 & 0 & 0 \\ 0 & -1 & 0 & 1 & 0 \end{bmatrix} \begin{bmatrix} \Delta u \\ \Delta \alpha \\ q \\ \Delta \theta \\ x_y \end{bmatrix} + \begin{bmatrix} X_{\delta_e} & X_\delta \\ Z_{\delta_e} & Z_\delta \\ M_{\delta_e} & M_\delta \\ 0 & 0 \\ 0 & 0 \end{bmatrix} \begin{bmatrix} \Delta \delta_e \\ \delta \end{bmatrix} + \begin{bmatrix} 0 \\ 0 \\ 0 \\ 0 \\ -\gamma_c \end{bmatrix} \quad (20)$$

where δ denotes the deflection vector of the multi-functional flight control surfaces 105.

Excitation Signal Generator

The excitation command signals to be sent to the drag-excitation flight control system 110 may be generated by an excitation signal generator 115 that employs a direct method, an indirect method, or both.

Direct Method

In the direct method, the excitation command signals for the deflections of the multi-functional flight control surfaces 105 are generated by a random function generator directly using the actual control variables $\delta_{i,j}$, where i=1, 2, . . . , $n_i$ denotes the index of the flight control surface along the wing span, and j=1, 2, . . . , $n_j$ denotes the index of the flight control surface along the wing chord. If $n_j$=1, then each of the actual control variables $\delta_{i,1}=\delta_i$ receives a random value generated by a random function generator as an excitation command signal. The random values are preselected to ensure the physical limits of the multi-functional flight control surfaces 105 are not exceeded. The amplitudes of the excitation command signals are also chosen to provide sufficient inputs to excite the aircraft to obtain good signal-to-noise ratio in the aircraft response and to ensure parameter convergence of the online model identification 125. This is described with respect to simulation results in Part 1 of Subsection C of Section VI of U.S. Provisional Patent Application No. 62/510,151, for example.

If $n_j$>1, then two approaches may be employed. In the first approach, each of the actual control variables $\delta_{i,j}$ receives a random value generated by a random function generator as an excitation command signal, as in the case of $n_j$=1.

In the second approach, a camber shape is prescribed based on the actual control variables $\delta_{i,n_j}$ corresponding to the outermost segments at the trailing edge. Each of the actual control variables $\delta_{i,n_j}$ receives a random value generated by a random function generator as an excitation command signal as in the case of $n_j$=1. Then, for some applications, a circular-arc camber shape can be used to describe the relationships between the actual control variables for the inner segments and excitation command signals for the actual control variables $\delta_{i,j}$ for the outermost segment according to:

$$\delta_{i,j} = \frac{j}{n_j}\delta_{i,n_j} \quad (21)$$

Alternatively, any other suitable camber shape could be used. For example, a parabolic camber shape can be used according to:

$$\delta_{i,j} = \frac{\sum_{k=1}^{j} k}{\sum_{k=1}^{n_j} k}\delta_{i,n_j} \quad (22)$$

Thus, in general, the relationships between the actual control variables $\delta_{i,j}$ for the inner segments and excitation command signals for the actual control variables $\delta_{i,n_j}$ for the outermost segment can be expressed as:

$$\delta_{i,j}=f(j,n_j)\delta_{i,n_j} \quad (23)$$

In some embodiments, the excitation command signals for the actual control variables $\delta_{i,j}$ can be generated by a preprogrammed schedule of values chosen based on the aircraft model information. The preprogrammed excitation signals may be executed in a two-sweep fashion: (1) an initial sweep 400; and (2) a directed sweep 500, as shown in the flow diagrams of FIGS. 4 and 5.

Figure 3B:
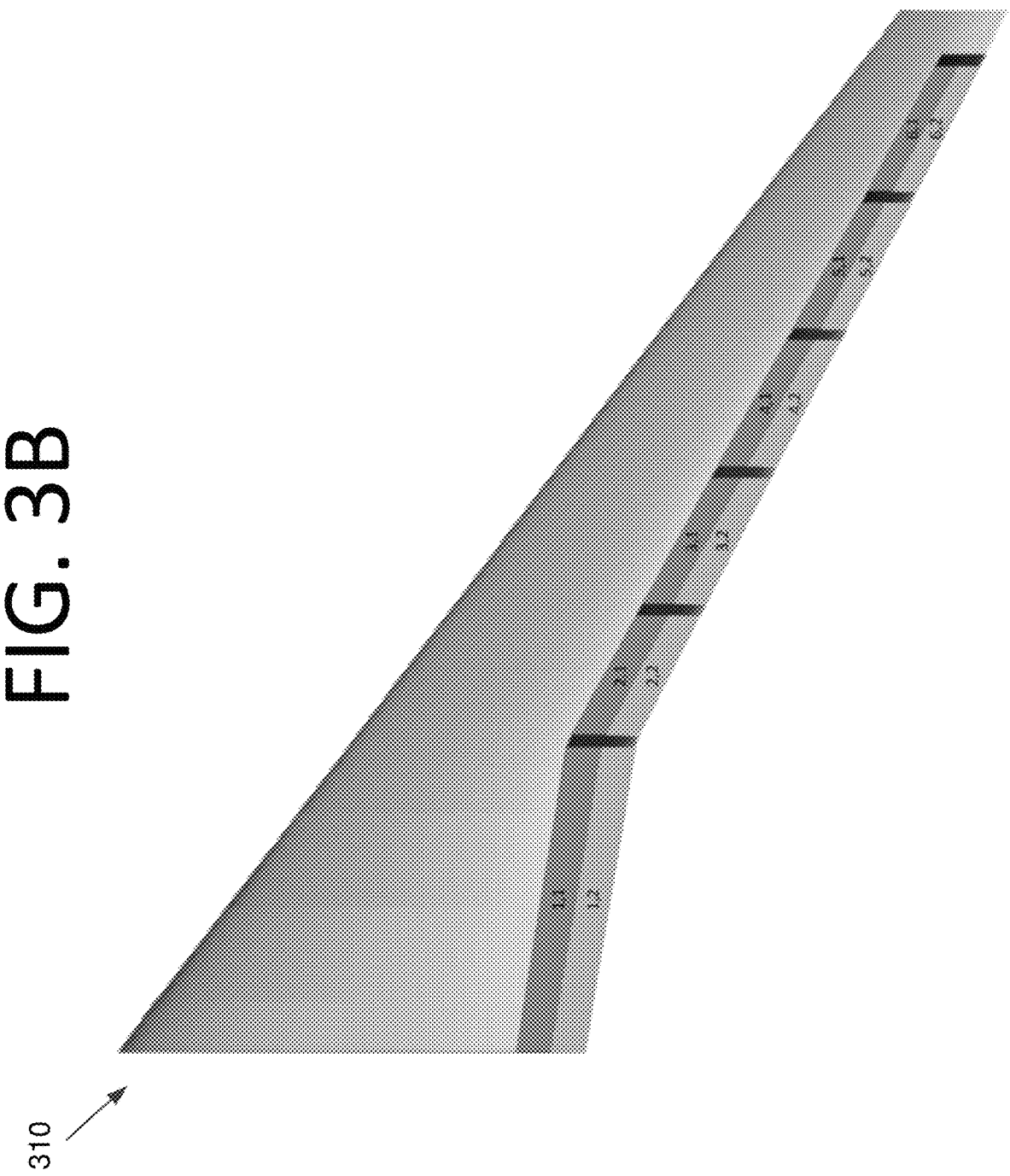
FIG. 3B illustrates a wing with a two-segment VCCTEF system that includes twelve flap sections, according to an embodiment of the present invention.

By way of example only, referring to wing 310 of FIG. 3B, the flap deflections are defined by the column vector δ such that:

$$\delta=[\delta_{1,1},\delta_{2,1},\delta_{3,1},\delta_{4,1},\delta_{5,1},\delta_{6,1},\delta_{1,2},\delta_{2,2},\delta_{3,2},\delta_{4,2},\delta_{5,2},\delta_{6,2}] \quad (24)$$

where flaps $\delta_{1,1}$ to $\delta_{6,1}$ represent the inner camber flaps from inboard to outboard and flaps $\delta_{1,2}$ to $\delta_{6,2}$ represent the trailing edge camber flaps from inboard to outboard. Thus, in this embodiment, there are a total of 12 degrees of freedom (DOF) for the full optimization. However, any number and location of flaps may be used without deviating from the scope of the invention.

For a plain flap optimization with both the inner camber flaps and the trailing edge camber flaps having the same deflections, the flap deflection vector a can be simplified to a 6 DOF vector as:

$$\delta=[\delta_{1,2},\delta_{2,2},\delta_{3,2},\delta_{4,2},\delta_{5,2},\delta_{6,2}] \quad (25)$$

with $\delta_{i,1}=\delta_{i,2}$, i=1, 2, ..., 6. For a circular-arc camber flap optimization, the flap deflection vector δ can be simplified to the same 6 DOF vector with $$\delta_{i,1} = \frac{\delta_{i,2}}{2}.$$

Indirect Method

The excitation command signals for the using the actual control variables $\delta_{i,j}$ are generated indirectly using the concept of virtual command variables. This method is particularly useful for multi-functional distributed flight control surfaces 105 and is described in Section II of U.S. Provisional Patent Application No. 62/510,151. The actual control variables $\delta_{i,j}$ representing the deflections of the multi-functional distributed flight control surfaces 105 are parameterized using a mathematically or piecewise smooth shape function with unknown parameters. This shape function can be any reasonable mathematical function, such as a Chebyshev polynomial (see also Eq. (13)):

$$\delta_{i,j} = \sum_{n=0}^{N} a_{n,j} T_n(x_i) \quad (26)$$

or a Fourier series function:

$$\delta_{i,j} = a_{0,j} \sum_{n=1}^{N} a_{n,j} \sin\frac{n\pi x_i}{2} \quad (27)$$

or a linear function:

$$\delta_{i,j}=a_{0,j}+a_{1,j}x_i \quad (28)$$

where $a_{n,j}$ are the virtual control variables and $x_i=y_i/L$ (see Eq. (7)). If $n_j=1$, each of the virtual control variables $a_{n,1}=a_n$ is generated by a random function generator as an excitation command signal. The amplitudes of the excitation command signals are chosen to ensure the physical limits of the multi-functional flight control surfaces 105 are not exceeded and also provide sufficient inputs to excite the aircraft to obtain a good signal-to-noise ratio in the aircraft response and to ensure parameter convergence of the online model identification 125.

If $n_j>1$, then either of the approaches above can be used. If the first approach is used, then each of the virtual control variables $a_{n,j}$ is generated by a random function generator as an excitation command signal. If the second approach is used, then the virtual control variables $a_{n,n_j}=a_n$ are generated by a random function generator as excitation command signals for the outermost segments of the multi-functional distributed flight control surfaces 105. Then, the excitation command signals for the virtual control variables $a_{n,j}$ for the inner segments can be computed from a prescribed camber shape relationship as described above with respect to the direct method.

In some embodiments, the excitation command signals for the virtual control variables $a_{n,j}$ can be generated by a preprogrammed schedule of values chosen based on the aircraft model information. The preprogrammed excitation signals are executed in a two-sweep fashion: (1) an initial sweep 400; and (2) a directed sweep 500, as described previously. See FIGS. 4 and 5. If $n_j=1$, then each of the virtual control variables $a_{n,1}=a_n$ is assigned a preprogrammed value as an excitation command signal.

If $n_j>1$, then either of the direct method approaches described above can be used. If the first approach is used, then each of the virtual control variables $a_{n,j}$ is assigned a preprogrammed value as an excitation command signal. If the second approach is used, then the virtual control variables $a_{n,n_j}=a_n$ are assigned preprogrammed valued as excitation command signals for the outermost segments of the multi-functional flight control surfaces 105. Then, the excitation command signals for the virtual control variables $a_{n,j}$ for the inner segments can be computed from a prescribed camber shape relationship as described above with respect to the direct method.

Aircraft and Wing Sensor System

The aircraft and the wings (e.g., aircraft 200 of FIG. 2) are equipped with sensors to provide aerodynamic measurements, aircraft state information, and wing deflection measurements. These measurements are used in the online model identification 125 to identify aircraft aerodynamic models as functions of the aircraft state and wing deflection information. The standard aircraft sensor system on an aircraft provides direct measurements of the aircraft angle of attack, flight path angle, and aircraft gross weight as a function of the fuel consumption indicated by engine fuel gauges. However, the novel aircraft and wing sensor system of some embodiments provides drag estimation, lift estimation, pitching moment estimation, and wing deflection measurements.

Drag Estimation

Figure 6A:
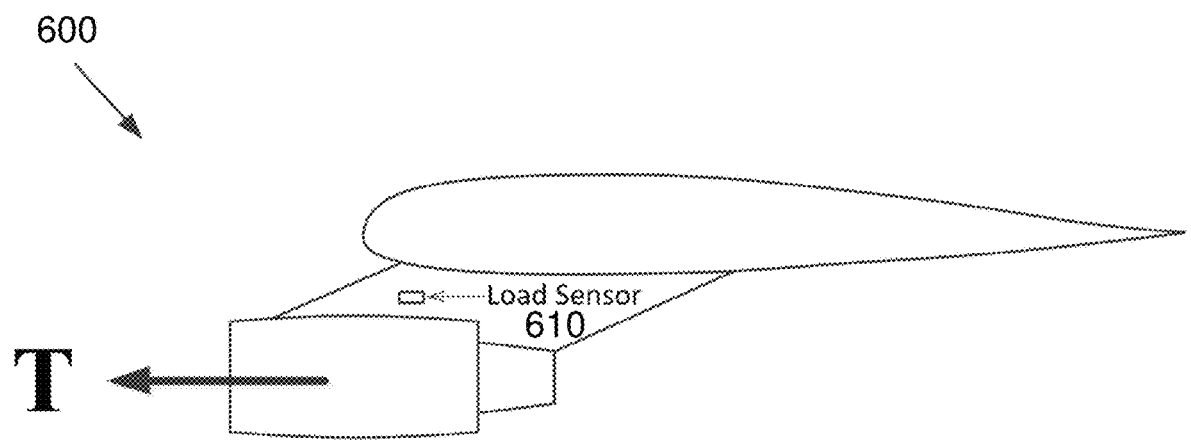
FIG. 6A is a side view illustrating an engine with a load sensor on the engine mount, according to an embodiment of the present invention.
Figure 6B:
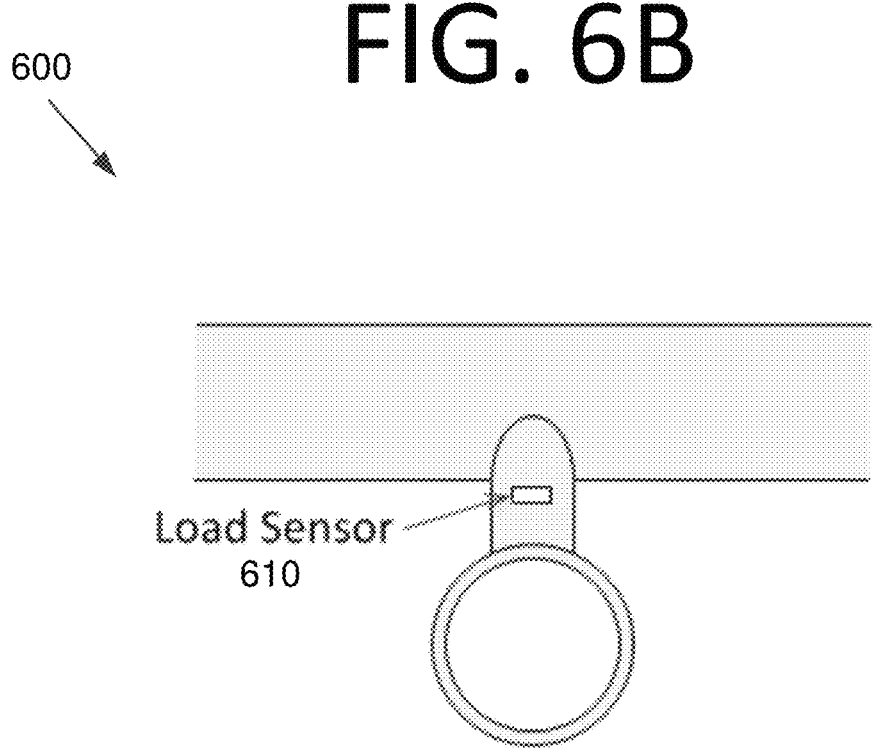
FIG. 6B is a front view illustrating the engine with the load sensor on the engine mount, according to an embodiment of the present invention.

One measurement to consider is the engine thrust, which is not typically measured in-flight. However, the engine thrust can potentially be synthesized from the available engine performance parameters. Another method for the engine thrust measurement is proposed as follows. A load sensor, which could be a load cell or strain gauge, for example, is installed on the engine mount internal structure attached to the wing structure, as shown in engine 600 of FIGS. 6A and 6B. In FIGS. 6A and 6B, a load cell 610 is used. A calibration can be performed during a static engine thrust measurement to provide a calibration relationship between the thrust of engine 600 and the output of load cell 610. Then, using the calibration relationship, the engine thrust can be estimated in-flight.

Figure 7A:
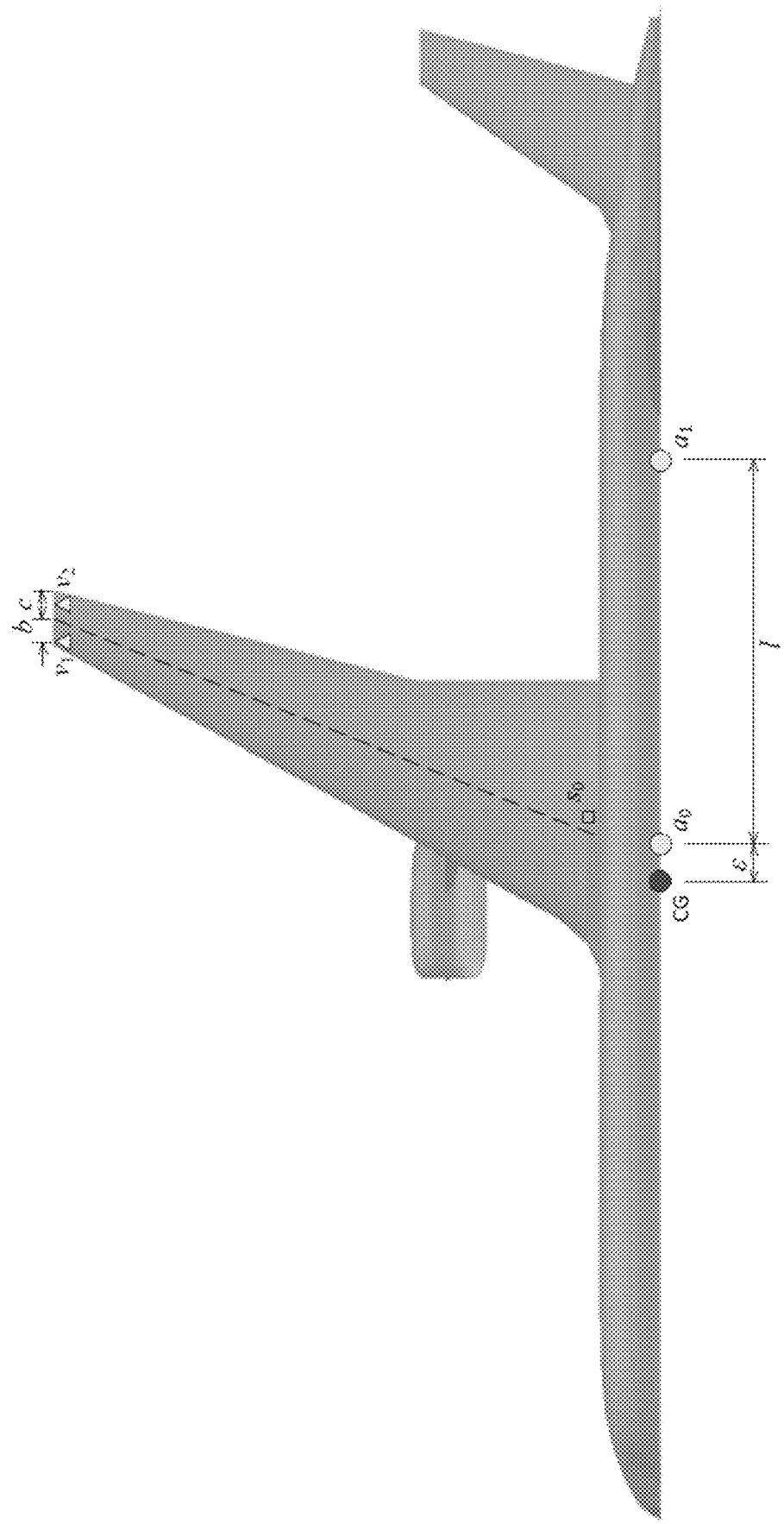
FIG. 7A illustrates normal acceleration measurements on an aircraft, according to an embodiment of the present invention.

To estimate the aircraft drag force, the aircraft acceleration, airspeed, gross weight, engine thrust, angle of attack, and flight path angle are required. The aircraft acceleration can be measured using a pair of accelerometers mounted along the aircraft fuselage axis of symmetry at a location near and at an aft location from the aircraft CG, as shown in aircraft 700 of FIG. 7A. These accelerometers are installed in a manner that allows them to measure the normal acceleration at the accelerometer locations in the substantially vertical plane with a positive sign convention indicating a downward acceleration. The aircraft CG generally shifts in-flight due to changes in the aircraft gross weight as a function of the fuel consumption. This CG shift is usually known a priori based on the engineering data from the aircraft manufacturer. The normal acceleration measurements as indicated by the normal accelerometers can be expressed as:

$$a_0 = \dot{w} + \varepsilon \dot{q} \quad (29)$$

$$a_1 = \dot{w} + (l+\varepsilon)\dot{q} \quad (30)$$

where $\dot{w}$ is the normal acceleration at the CG of aircraft 700, $\dot{q}$ is the pitch acceleration about the CG of aircraft 700, and E can be computed from engineering data as a function of the fuel consumption.

Then, the normal acceleration at the CG of aircraft 700 can be computed as:

$$\dot{w} = a_0 - \varepsilon\left(\frac{a_1 - a_0}{l}\right) \quad (31)$$

If l is chosen to be as large as possible by placing the aft accelerometer as close to the tail end of the fuselage as possible, then the ratio $\varepsilon/l$ is small enough that $\dot{w} \approx a_0$.

Figure 7B:
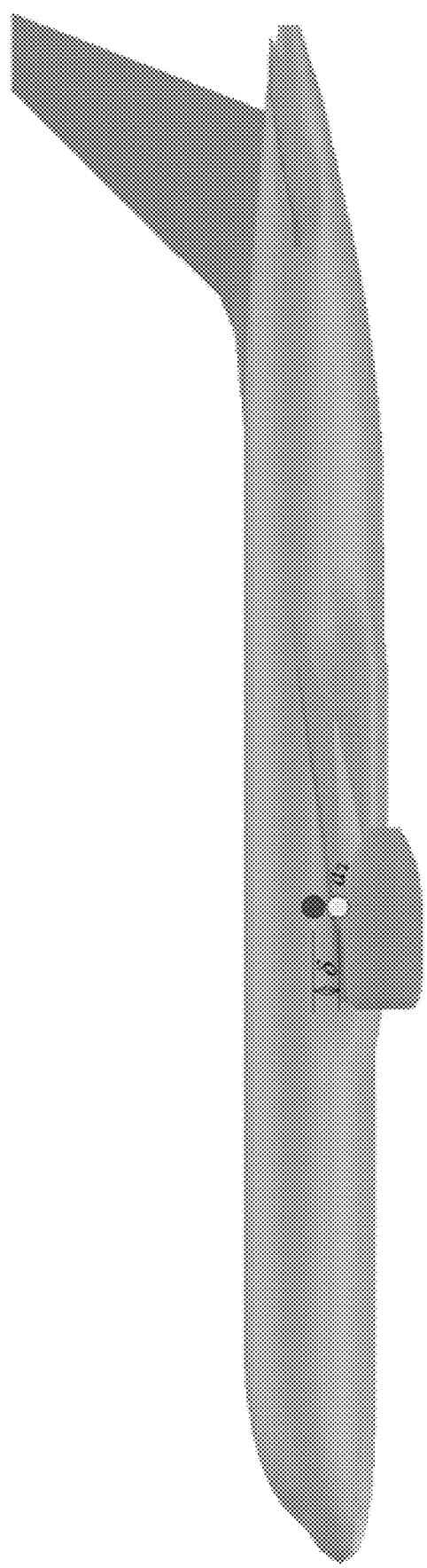
FIG. 7B illustrates forward acceleration measurements on the aircraft, according to an embodiment of the present invention.

The forward acceleration measurement of the aircraft can be made by placing an accelerometer near the CG of aircraft 700 along the vertical direction, as shown in FIG. 7B. The forward acceleration measurement as indicated by the forward accelerometer can be expressed as:

$$a_2 = \dot{u} + \delta \dot{q} \quad (32)$$

where $\dot{u}$ is the forward acceleration at the CG of aircraft 700.

Then, the forward acceleration at the CG of aircraft 700 can be computed as:

$$\dot{u} = a_2 - \delta\left(\frac{a_2 - a_1}{l}\right) \quad (33)$$

If the total lateral acceleration is neglected, then the aircraft acceleration can be estimated by the formula:

$$\dot{V} = \dot{u} \cos \alpha + \dot{w} \sin \alpha \quad (34)$$

where $\alpha$ is the angle of attack.

The drag force on aircraft 700 can now be estimated directly using the formula:

$$D = T \cos \alpha - W\left(\frac{\dot{V}}{g} + \sin \gamma\right) \quad (35)$$

where W is the gross weight of aircraft 700, g is the gravitational acceleration, and $\gamma$ is the flight path angle.

Alternatively, the drag force can be estimated adaptively using a least-squares method as follows:

$$\dot{\hat{D}} = \Gamma \frac{W}{g}(\dot{\hat{V}} - \dot{V}) \quad (36)$$

where $\Gamma > 0$ is a positive constant to be chosen and $\dot{\hat{V}}$ is a signal that estimates the airspeed acceleration constructed as:

$$\dot{\hat{V}} = \frac{g(T \cos \alpha - \hat{D} - W \sin \gamma)}{W} \quad (37)$$

Another approach is an acceleration sensor-free method that is described as follows. The aircraft acceleration can be estimated numerically in two ways.

The first method is to numerically differentiate the airspeed signal using a backward finite difference method to estimate the aircraft acceleration according to the formula:

$$\dot{V} \approx \frac{V(t) - V(t - \Delta t)}{\Delta t} \quad (38)$$

Prior to numerical differentiation, the airspeed signal is passed through a low-pass filter to remove any noise in the signal. This would help reduce the potential of introducing noise into the estimate of the aircraft acceleration. Then, the signal V is used in either Eq. (35) or Eq. (36) to estimate the drag force.

The second method is to construct a signal that estimates the aircraft acceleration without numerical differentiation according to the formula:

$$\dot{\hat{V}} = -\lambda(\hat{V} - V) + \frac{g(T \cos \alpha - \hat{D} - W \sin \gamma)}{W} \quad (39)$$

where $\lambda > 0$ is a positive constant to be chosen. The drag force is then estimated adaptively as follows:

$$\dot{\hat{D}} = \frac{\Gamma g(\hat{V} - V)}{\lambda W} \quad (40)$$

The drag coefficient is computed as:

$$C_D = \frac{D}{q_\infty S} \quad (41)$$

where $q_\infty$ is the free-stream dynamic pressure and S is the wing reference area.

Lift Estimation

The lift force can be estimated from the aircraft acceleration measurements. The flight path angular rate can be computed from the acceleration measurements as follows:

$$\dot{\gamma} = \dot{\theta} - \dot{\alpha} = q - \frac{\dot{w} - \dot{u} \tan \alpha}{u \sec^2 \alpha} \quad (42)$$

where q is the pitch rate, u is the forward component of the airspeed, and w is the normal component of the airspeed. The lift force can now be estimated directly by the formula:

$$L = W\left(\frac{V\dot{\gamma}}{g} + \cos\gamma\right) \quad (43)$$

Alternatively, the lift force can be estimated adaptively using the least-squares method as follows:

$$\dot{\hat{L}} = -\frac{\Gamma WV(\dot{\hat{\gamma}} - \dot{\gamma})}{g} \quad (44)$$

where j is a signal that estimates the flight path angular rate constructed as:

$$\dot{\hat{\gamma}} = \frac{g(\hat{L} - W\cos\gamma)}{WV} \quad (45)$$

Another approach is an acceleration sensor-free method that estimates the flight path angular rate numerically in two ways.

The first method is to numerically differentiate the flight path angle signal using a backward finite difference method to estimate the flight path angular rate according to the formula:

$$\dot{\gamma} \approx \frac{\gamma(t) - \gamma(t - \Delta t)}{\Delta t} \quad (46)$$

Prior to numerical differentiation, the flight path angle signal is passed through a low-pass filter to remove any noise in the signal. This would help reduce the potential of introducing noise into the estimate of the flight path angular rate. Then, the signal $\dot{\gamma}$ is used in either Eq. (43) or Eq. (44) to estimate the lift force.

The second method is to construct a signal that estimates the flight path angular rate without numerical differentiation according to the formula:

$$\dot{\hat{\gamma}} = -\lambda(\hat{\gamma} - \gamma) + \frac{g(\hat{L} - W\cos\gamma)}{WV} \quad (47)$$

The lift force is then estimated adaptively as follows:

$$\dot{\hat{L}} = -\frac{\Gamma g(\hat{\gamma} - \gamma)}{\lambda WV} \quad (48)$$

The lift coefficient is computed as:

$$C_L = \frac{L}{q_\infty S} \quad (49)$$

Pitching Moment Estimation

The pitching moment can be estimated from the normal acceleration measurements described above. The pitch acceleration can be computed as:

$$\dot{q} = \frac{a_1 - a_0}{l} \quad (50)$$

The pitching moment on the aircraft can now be estimated directly by the formula:

$$M = I_{yy}\dot{q} - Tz_e \quad (51)$$

where $I_{yy}$ is the pitch inertia of aircraft 700 as a function of the fuel consumption available from the manufacturer of aircraft 700 and $z_e$ is the engine vertical offset from the CG of aircraft 700 with a positive sign indicating that the engine thrust line is below the CG of aircraft 700.

Alternatively, the pitching moment can also be estimated adaptively using a least-squares method as follows: $\dot{\hat{M}}$ $$\dot{\hat{M}} = \Gamma_{I_{yy}}(\dot{\hat{q}} - \dot{q}) \quad (52)$$

where a is a signal that estimates the pitch acceleration constructed as:

$$\dot{\hat{q}} = \frac{\hat{M} + Tz_e}{I_{yy}} \quad (52A)$$

Another approach is an acceleration sensor-free method that estimates the pitch acceleration numerically in two ways.

The first method is to numerically differentiate the pitch rate signal using a backward finite difference method to estimate the pitch acceleration according to the formula:

$$\dot{q} \approx \frac{q(t) - q(t - \Delta t)}{\Delta t} \quad (53)$$

Prior to numerical differentiation, the pitch rate signal is passed through a low-pass filter to remove any noise in the signal. This would help reduce the potential of introducing noise into the estimate of the pitch acceleration. Then, the signal $\dot{q}$ is used in either Eq. (51) or Eq. (52) to estimate the lift force.

The second method is to construct a signal that estimates the pitch acceleration without numerical differentiation according to the formula:

$$\dot{\hat{q}} = -\lambda(\hat{q} - \gamma) + \frac{\hat{M} + Tz_e}{I_{yy}} \quad (54)$$

The pitching moment is then estimated adaptively as follows:

$$\dot{\hat{M}} = -\frac{\Gamma(\hat{q} - q)}{\lambda I_{yy}} \quad (55)$$

The pitching moment coefficient is computed as:

$$C_m = \frac{M}{q_\infty S\bar{c}} \quad (56)$$

where $\bar{c}$ is the mean aerodynamic chord.

Wing Aeroelastic Deflection Measurements

Wing aeroelastic deflection information is required for the drag-excitation flight control system 110 and online model identification 125 for aircraft equipped with flexible wing structures in some embodiments. The wing deflection information includes the wing bending deflection and twist at the wing tip, as well as their velocities. This information can be established by measurements provided by a strain gauge rosette installed at the wing root or other suitable locations and velocity transducers installed at the wing tip, as shown in FIG. 7B. The strain gauge rosette installed at the location $s_0$ at the wing root is designed to measure the both types of strain due to the wing bending and torsion. A calibration is then performed with the applied loads on the wings representative of the flight loads, such as during a wing proof load testing. The wing bending deflection $w_t$ and twist $\theta_t$ at the wing tip are then measured as a function of the strain gauge rosette outputs to establish the calibration relationships. Then, the strain gauge rosette signals measured in-flight provide a method for estimating the wing deflection information.

Similar calibration can be conducted with velocity transducers installed at the wing tip. The indicated velocities can be expressed as:

$$v_1 = \dot{w}_t + b\dot{\theta}_t \tag{57}$$

$$v_2 = \dot{w}_t + c\dot{\theta}_t \tag{58}$$

The velocities due to the wing bending deflection $\dot{w}_t$ and twist $\dot{\theta}_t$ at the wing tip can be computed as:

$$\dot{w}_t = \frac{bv_2 + cv_1}{b+c} \tag{59}$$

$$\dot{\theta}_t = \frac{v_1 - v_2}{b+c} \tag{60}$$

Online Model Identification

The real-time drag optimization framework 100 of some embodiments includes an online model identification 125 that is designed to estimate aerodynamic models of the aircraft for use in the real-time drag optimization method. The online model identification 125 receives input signals from the excitation signal generator 115 and the aircraft and wing sensor system and computes surrogate aerodynamic models for the aircraft lift, drag, and pitching moment as functions of the aircraft angle of attack, the actual or virtual control variables of the multi-functional flight control surfaces 105, and the wing bending deflection and twist at the wing tip. The surrogate aerodynamic models using the virtual control variables based on the indirect excitation signal generation method are described in Section III of U.S. Provisional Patent Application No. 62/510,151, for example.

Direct Method

In some embodiments that use the actual control vector or flap deflection vector $\delta$, the lift coefficient is modeled as a linear function taking into account of wing aeroelasticity by $$C_L = C_{L_0} + C_{L_\alpha}\alpha + C_{L_\delta}\delta + C_{L_{w_t}}w_t + C_{L_{\theta_t}}\theta_t + C_{L_{\delta_e}}\delta_e \tag{61}$$

The drag coefficient for an aeroelastic aircraft is approximated to have a quadratic relation according to $$\begin{aligned}C_D =\ & C_{D_0} + C_{D_\alpha}\alpha + C_{D_\delta}\delta + C_{D_{w_t}}w_t + C_{D_{\theta_t}}\theta_t + C_{D_{\delta_e}}\delta_e + \\& C_{D_{\alpha^2}}\alpha^2 + C_{D_{\delta\alpha}}\delta\alpha + C_{D_{w_t\alpha}}w_t\alpha + C_{D_{\theta_t\alpha}}\theta_t\alpha + C_{D_{\delta_e\alpha}}\delta_e\alpha + \\& \delta^T C_{D_{\delta^2}}\delta + C_{D_{w_t\delta}}w_t\delta + C_{D_{\theta_t\delta}}\theta_t\delta + C_{D_{\delta_e\delta}}\delta_e\delta + C_{D_{w_t^2}}w_t^2 + \\& C_{D_{\theta_t w_t}}\theta_t w_t + C_{D_{\delta_e w_t}}\delta_e w_t + C_{D_{\theta_t^2}}\theta_t^2 + C_{D_{\delta_e\theta_t}}\delta_e\theta_t + C_{D_{\delta_e^2}}\delta_e^2\end{aligned} \tag{62}$$

The pitching moment coefficient is modeled as a linear function by $$C_m = C_{m_0} + C_{m_\alpha}\alpha + C_{m_\delta}\delta + C_{m_{w_t}}w_t + C_{m_{\theta_t}}\theta_t + C_{m_{\delta_e}}\delta_e \tag{63}$$

The wing tip bending deflection and wing tip torsional twist are generally related to the angle of attack $\alpha$ and the actual control vector $\delta$ according to $$w_t = w_{t_0} + w_{t_\alpha}\alpha + w_{t_\delta}\delta \tag{64}$$

$$\theta_t = \theta_{t_0} + \theta_{t_\alpha}\alpha + \theta_{t_\delta}\delta \tag{65}$$

In some other embodiments, the wing tip bending deflection and wing tip torsional twist are combined implicitly with the angle of attack $\alpha$ and flap deflection vector $\delta$. The lift coefficient can then be modeled explicitly as a linear function of the angle of attack $\alpha$, the flap deflection vector $\delta$, and the elevator deflection $\delta_e$, or more generally as a quadratic function of the angle of attack $\alpha$ according to $$\begin{aligned}C_L =\ & C_{L_0} + C_{L_\alpha}\alpha + C_{L_\delta}\delta + C_{L_{\delta_e}}\delta_e + C_{L_{\alpha^2}}\alpha^2 + \\& C_{L_{\delta\alpha}}\delta\alpha + C_{L_{\delta_e\alpha}}\delta_e\alpha + \delta^T C_{L_{\delta^2}}\delta + C_{L_{\delta_e\delta}}\delta_e\delta + C_{L_{\delta_e^2}}\delta_e^2\end{aligned} \tag{66}$$

For a linear representation of the lift coefficient, $C_{L_\alpha^2} = 0$, $C_{L_{\alpha\delta}} = 0$, $$C_{L_{\alpha^2}} = 0,\ C_{L_{\alpha\delta}} = 0,\ C_{L_{\alpha\delta_e}} = 0,\ C_{L_{\delta^2}} = 0,\ C_{L_{\delta\delta_e}} = 0,\ \text{and}\ C_{L_{\delta_e^2}} = 0.$$

The quadratic function of the lift coefficient can improve the accuracy of the lift model when the angle of attack $\alpha$, the flap deflection vector $\delta$, and the elevator deflection $\delta_e$ become large.

It should be understood that other functions for the lift coefficient could be used in lieu of Eq. (61) or (66). For example, the lift coefficient could also be represented by a piecewise continuous cubic spline function or a cubic polynomial.

The drag coefficient can also be modeled as a quadratic function of the angle of attack $\alpha$, the flap deflection vector $\delta$, and the elevator deflection $\delta_e$, or more generally as a quartic function of the angle of attack $\alpha$ according to $$C_D = C_{D_0} + C_{D_\alpha}\alpha + C_{D_\delta}\delta + C_{D_{\delta_e}}\delta_e + C_{D_{\alpha^2}}\alpha^2 + C_{D_{\delta\alpha}}\delta\alpha + \tag{67}$$

-continued
$$C_{D_{\delta_e a}} \delta_e \alpha + \delta^T C_{D_{\delta^2}} \delta + C_{D_{\delta_e \delta}} \delta_e \delta + C_{D_{\delta_e^2}} \delta_e^2 + C_{D_{\alpha^3}} \alpha^3 + C_{D_{\alpha^4}} \alpha^4$$

For a quadratic representation of the drag coefficient, $c_{D_a^3}=0$ and $c_{D_a^4}=0$. The quartic function of the drag coefficient can improve accuracy of the drag model in the region of low angle of attack $\alpha$.

It should be understood that other functions for the drag coefficient could be used in lieu of Eq. (62) or (67). For example, the drag coefficient could also be represented by a piecewise continuous cubic spline function or $a_6'$ degree polynomial of the angle of attack $\alpha$.

In a similar fashion as the lift coefficient, the pitching moment coefficient can be represented by $$C_m = C_{m_0} + C_{m_\alpha} \alpha + C_{m_\delta} \delta + C_{m_{\delta_e}} \delta_e + C_{m_{\alpha^2}} \alpha^2 +$$
$$C_{m_{\delta\alpha}} \delta\alpha + C_{m_{\delta_e\alpha}} \delta_e\alpha + \delta^T C_{m_{\delta^2}} \delta + C_{m_{\delta_e\delta}} \delta_e\delta + C_{m_{\delta_e^2}} \delta_e^2 \quad (68)$$

The estimates of $C_L$, $C_D$, and $C_m$, taking into account of wing aeroelasticity, can be represented in general as a function of basis vectors such that:

$$\hat{C}_L = \Theta_L^T \Phi_L(\alpha, \delta, w_t, \theta_t, \delta_e) \quad (69)$$

$$\hat{C}_D = \Theta_D^T \Phi_D(\alpha, \delta, w_t, \theta_t, \delta_e) \quad (70)$$

$$\hat{C}_m = \Theta_m^T \Phi_m(\alpha, \delta, w_t, \theta_t, \delta_e) \quad (71)$$

where the basis vectors are selected to be:

$$\Phi_L(\alpha, \delta, w_t, \theta_t, \delta_e) = [1, \alpha, \delta^T, \alpha^2, \alpha\delta^T, \alpha w_t, \alpha\theta_t, \alpha\delta_e, ele(\delta\delta^T),$$
$$\delta^T w_t, \delta^T \theta_t, \delta^T \delta_e, w_t^2, w_t\theta_t, w_t\delta_e, \theta_t^2, \theta_t\delta_e, \delta_e^2, \alpha^3, \alpha^4]^T \quad (72)$$

$$\Phi_D(\alpha, \delta, w_t, \theta_t, \delta_e) = [1, \alpha, \delta^T, \alpha^2, \alpha\delta^T, \alpha w_t, \alpha\theta_t, \alpha\delta_e, ele(\delta\delta^T),$$
$$\delta^T w_t, \delta^T \theta_t, \delta^T \delta_e, w_t^2, w_t\theta_t, w_t\delta_e, \theta_t^2, \theta_t\delta_e, \delta_e^2, \alpha^3, \alpha^4]^T \quad (63)$$

$$\Phi_m(\alpha, \delta, w_t, \theta_t, \delta_e) = [1, \alpha, \delta^T, \alpha^2, \alpha\delta^T, \alpha w_t, \alpha\theta_t, \alpha\delta_e, ele(\delta\delta^T),$$
$$\delta^T w_t, \delta^T \theta_t, \delta^T \delta_e, w_t^2, w_t\theta_t, w_t\delta_e, \theta_t^2, \theta_t\delta_e, \delta_e^2, \alpha^3, \alpha^4]^T \quad (74)$$

where $ele(\delta\delta^T)$ is a row vector of all elements of the matrix SST.

A recursive least-squares (RLS) method is used to estimate the unknown parameters $\Theta_L$ and $\Theta_D$ at every time step by the following update law:

$$\Theta_i = \Theta_{i-1} + K_i(y_i^T - \Phi_i^T \Theta_{i-1}) \quad (75)$$

where $\Theta_i$ is $\Theta_L$, $\Theta_D$, or $\Theta_m$; $y_i$ can be measured $C_L$, $C_D$, or $C_m$; and $K_i$ is given by:

$$K_i = \frac{R_{i-1} \Phi_i}{\beta + \Phi_i^T R_{i-1} \Phi_i} \quad (76)$$

where $\beta > 0$ and $R_i$ is the covariance matrix with the following update law:

$$R_i = \frac{1}{\lambda}\left[I - R_{i-1}\left(\frac{\Phi_i \Phi_i^T}{\beta + \Phi_i^T R_{i-1} \Phi_i}\right)\right] R_{i-1} \quad (77)$$

and $\lambda$ is a forgetting factor that is usually set to 1, but can be adjusted for time-varying noise conditions.

In some embodiments, an online training set of random excitation signals are generated for the aerodynamic model identification of the estimates of $C_L$, $C_D$, and $C_m$. After a sufficient number of data sample, the estimates should converge toward the "true" values of $C_L$, $C_D$, and $C_m$ if the excitation signals are persistently exciting.

In some other embodiments, the excitation command signals for the virtual control variables $a_{n,j}$ can be generated by a preprogrammed schedule of values chosen based on the aircraft model information. The preprogrammed excitation signals are executed in two-sweep fashion: an initial sweep 400 and a directed sweep 500 as described previously. If $n_j=1$, then each of the control variables $\delta_{i,1}=\delta_i$ is assigned a preprogrammed value as an excitation command signal.

If $n_j>1$, then either of the approaches described above can be used. If the first approach is used, then each of the actual control variables $\delta_{i,j}$ is assigned a preprogrammed value as an excitation command signal. If the second approach is used, then the actual control variables $d_{i,n_j}$ are assigned preprogrammed values as excitation command signals for the outermost segments of the multi-functional flight control surfaces. Then, the excitation command signals for the actual control variables $d_{i,j}$ for the inner segments can be computed from a prescribed camber shape relationship as described by Eq. (21), (22), or (23).

Figure 4:
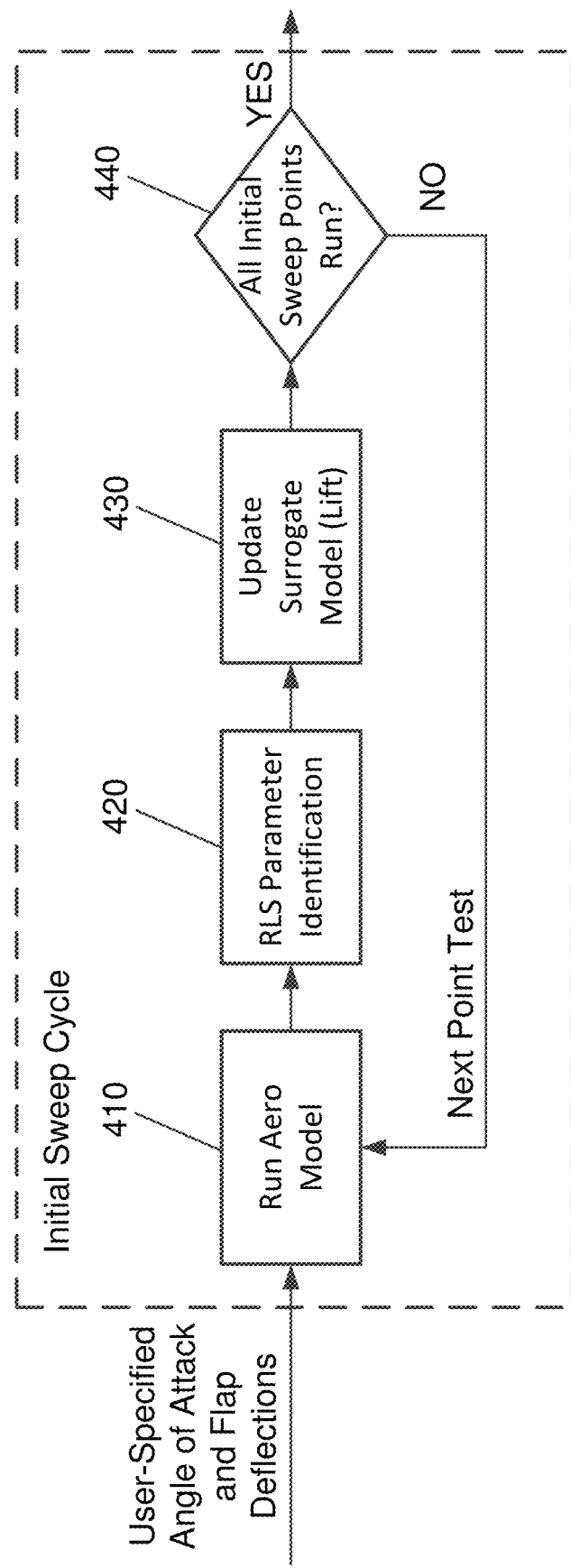
FIG. 4 is a flow diagram illustrating an initial sweep cycle for aerodynamic model identification, according to an embodiment of the present invention.
Figure 5:
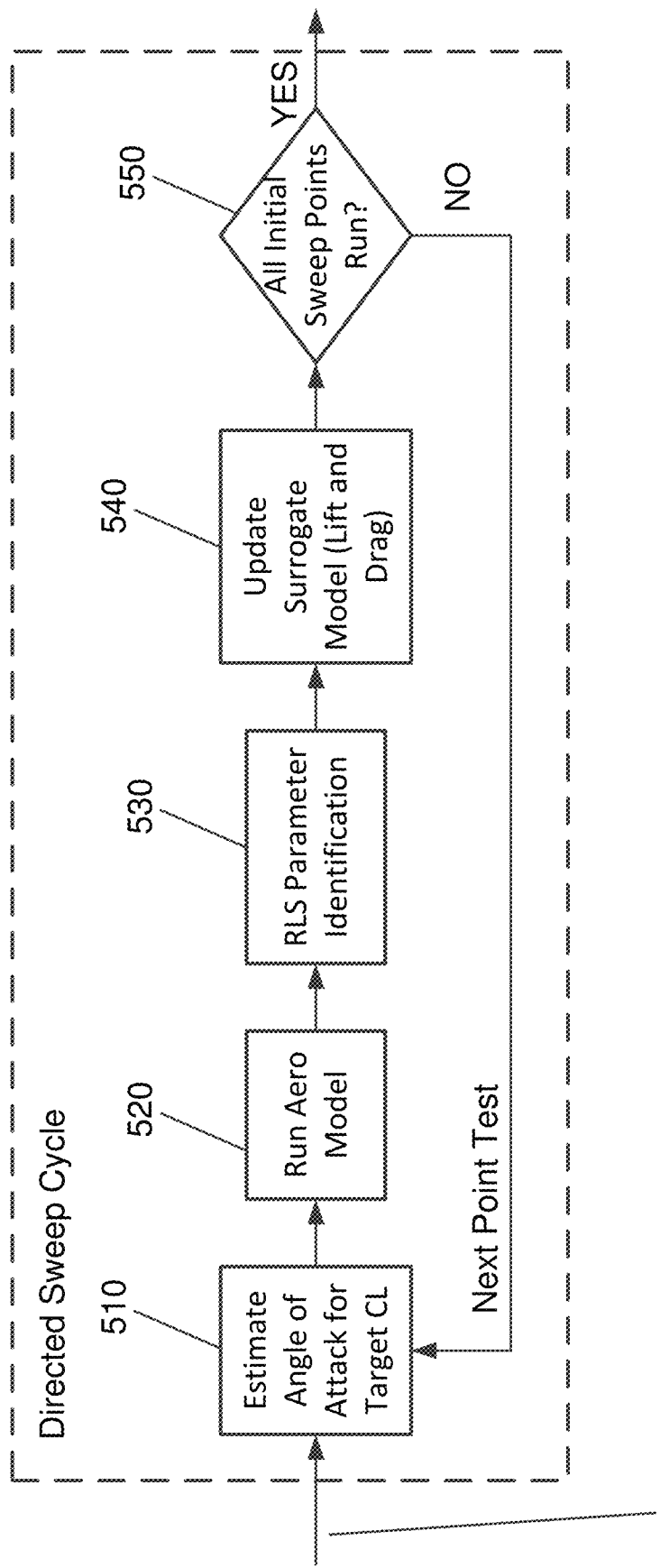
FIG. 5 is a flow diagram illustrating a directed sweep cycle, according to an embodiment of the present invention.

An initial sweep cycle 400 for the aerodynamic model identification is conducted as shown in FIG. 4. The primary purpose of initial sweep cycle 400 is to identify an approximate surrogate model for $C_L$ given by:

$$\hat{C}_L = \hat{\bar{C}}_{L_0} + \hat{\bar{C}}_{L_\alpha}\alpha + \hat{\bar{C}}_{L_\delta}\delta + \hat{\bar{C}}_{L_{\alpha^2}}\alpha^2 + \hat{\bar{C}}_{L_{\delta\alpha}}\delta\alpha + \delta^T$$
$$\hat{\bar{C}}_{L_{\delta^2}}\delta \quad (78)$$

where the bar symbols denote the trim lift coefficient sensitivities, or derivatives, corresponding to the trim elevator deflection $\delta_e = f(\alpha, \delta)$ for which the total trim pitching moment coefficient, taking into account the engine thrust contribution, satisfies the requirement of $$C_m + C_D \frac{z_e}{\bar{c}} = 0.$$

The estimates of the sensitivities of $C_L$ are computed by the RLS parameter update laws in Eqs. (75)-(77) at each time step. The collection of test points during the initial sweep 400 is specified during the initialization of the algorithm. The estimates of $C_L$ can be represented as a function of basis vectors such that:

$$\hat{C}_L = \Theta_L^T \Phi_L(\alpha, \delta) \quad (79)$$

The initial sweep cycle 400 is first conducted by running the surrogate model for the lift coefficient at 410 using the user-specified angle of attack and flap deflections. Output from the surrogate model for the lift coefficient is used for the RLS parameter identification at 420, and the surrogate model for the lift coefficient is updated at 430. This is performed for all initial sweep points. When all initial sweep points have been run at 440, the flow proceeds to FIG. 5.

The excitation command and the aircraft angle of attack command signals are varied according to the preprogrammed schedule initially. An angle of attack command drag-excitation flight control system 110 is then designed to meet the angle of attack command signal with the excitation command signals. The initial sweep 400 provides inputs to the online model identification 125 to identify the lift relationship between the angle of attack and the actual control variables $\delta_{i,j}$ representing the deflections of the multi-functional flight control surfaces 105.

A directed sweep 500 is then performed next by only varying the excitation command signals according to the preprogrammed schedule. The process for a directed sweep cycle 500 is shown in the flow diagram of FIG. 5. After initial sweep cycle 400 is complete, a directed training sweep 500 is performed. See FIG. 5. Similar to initial sweep cycle 400, user-specified flap deflections are utilized. However, only the excitation command signals are varied according to the preprogrammed schedule. The angle of attack command is computed from the surrogate model for the lift coefficient identified from the initial sweep 400. Both the computed angle of attack command and pre-programmed excitation command signals are then executed by the angle of attack command drag-excitation flight control system 110 to provide inputs to the online model identification 125 for drag estimation.

The angle of attack for the directed sweep 500 is automatically calculated at 510 based on the surrogate model for $C_L$. The objective of the directed sweep 500 is to obtain a simpler surrogate model for drag that captures the drag behavior in the local region where the trim lift coefficient $C_L = \overline{C}_L$. The trim angle of attack for $C_L = \overline{C}_L$ can be calculated as a function of the specified flap deflections as:

$$\alpha = -\frac{\hat{C}_{L_\alpha} + \hat{C}_{L_{\delta\alpha}}\delta}{2\hat{C}_{L_{\alpha^2}}}\left[1 - \sqrt{1 + \frac{4\hat{C}_{L_{\alpha^2}}(\hat{C}_L - \hat{C}_{L_0} - \hat{C}_{L_\delta}\delta - \delta^T \hat{C}_{L_{\delta^2}}\delta)}{(\hat{C}_{L_\alpha} + \hat{C}_{L_{\delta\alpha}}\delta)^2}}\right] \quad (80)$$

Note that usually $\hat{C}_{L_\alpha^2} < 0$. When $\hat{C}_{L_\alpha^2}$ and $\hat{C}_{L_{\delta\alpha}}\delta$ are much smaller than $\hat{C}_{L_\alpha}$, then the angle of attack $\alpha$ can be approximated as $$\alpha \cong \frac{\hat{C}_L - \hat{C}_{L_0} - \hat{C}_{L_\delta}\delta - \delta^T \hat{C}_{L_{\delta^2}}\delta}{\hat{C}_{L_\alpha}} \quad (81)$$

During the directed sweep 500, the lift coefficient is maintained to be approximately equal to a given fixed lift coefficient of $\overline{C}_L$. Then, an approximate surrogate model for the trim drag coefficient is a function of the flap deflection vector $\delta$ only in the local region where $C_L = \overline{C}_L$, given by:

$$\hat{C}_D = \hat{\overline{C}}_{D_0} + \hat{\overline{C}}_{D_\alpha}\alpha(\delta) + \hat{\overline{C}}_{D_\delta}\delta + \hat{\overline{C}}_{D_{\alpha^2}}\alpha^2(\delta) + \hat{\overline{C}}_{D_{\delta\alpha}}\delta\alpha(\delta) + \delta^T \hat{\overline{C}}_{D_{\delta^2}}\delta \quad (82)$$

where the bar symbols denote the trim drag coefficient sensitivities, or derivatives, corresponding to the trim lift coefficient $C_L = \overline{C}_L$.

During the directed training sweep 500, the surrogate model for $C_D$ is estimated by the RLS parameter update laws in Eq. (75)-(77) at each time step. The collection of test points during the directed sweep 500 is specified during the initialization of the algorithm. The estimates of $C_D$ can be represented as a function of basis vectors such that:

$$\hat{C}_D = \Theta_D^T \Phi_D(\delta) \quad (83)$$

The surrogate model for the drag coefficient is only updated if $C_L$ is within a certain tolerance of $\overline{C}_L$. In other words, the RLS parameter update laws in Eq. (75)-(77) are only used when $|C_L - \overline{C}_L| \leq \epsilon_L$. For testing, $\epsilon_L$ is normally set at 1% of $\overline{C}_L$. Steps 520, 530, 540, 550 are similar to steps 410, 420, 430, 440, respectively, of FIG. 4.

Indirect Method

In some embodiments that use the virtual control vector a, the lift coefficient is modeled as a linear function taking into account of wing aeroelasticity by $$C_L = C_{L_0} + C_{L_\alpha}\alpha + C_{L_a}a + C_{L_{w_t}}w_t + C_{L_{\theta_t}}\theta_t + C_{L_{\delta_e}}\delta_e \quad (84)$$

The drag coefficient for an aeroelastic aircraft is approximated to have a quadratic relation according to $$C_D = C_{D_0} + C_{D_\alpha}\alpha + C_{D_a}a + C_{D_{w_t}}w_t + C_{D_{\theta_t}}\theta_t + C_{D_{\delta_e}}\delta_e + \quad (85)$$
$$C_{D_{\alpha^2}}\alpha^2 + C_{D_{a\alpha}}a\alpha + C_{D_{w_t\alpha}}w_t\alpha + C_{D_{\theta_t\alpha}}\theta_t\alpha + C_{D_{\delta_e\alpha}}\delta_e\alpha +$$
$$a^T C_{D_{a^2}}a + C_{D_{w_ta}}w_ta + C_{D_{\theta_ta}}\theta_ta + C_{D_{\delta_ea}}\delta_ea + C_{D_{w_t^2}}w_t^2 +$$
$$C_{D_{\theta_tw_t}}\theta_tw_t + C_{D_{\delta_ew_t}}\delta_ew_t + C_{D_{\theta_t^2}}\theta_t^2 + C_{D_{\delta_e\theta_t}}\delta_e\theta_t + C_{D_{\delta_e^2}}\delta_e^2$$

The pitching moment coefficient is modeled as a linear function by $$C_m = C_{m_0} + C_{m_\alpha}\alpha + C_{m_a}a + C_{m_{w_t}}w_t + C_{m_{\theta_t}}\theta_t + C_{m_{\delta_e}}\delta_e \quad (86)$$

The wing tip bending deflection and wing tip torsional twist are generally related to the angle of attack and the virtual control vector a according to $$w_t = w_{t_0} + w_{t_\alpha}\alpha + w_{t_a}a \quad (87)$$

$$\theta_t = \theta_{t_0} + \theta_{t_\alpha}\alpha + \theta_{t_a}a \quad (88)$$

In some other embodiments, the wing tip bending deflection and wing tip torsional twist are combined implicitly with the angle of attack $\alpha$ and the virtual control vector a. The lift coefficient can then be modeled explicitly as a linear function of the angle of attack $\alpha$, the virtual control vector a, and the elevator deflection $\delta_e$, or more generally as a quadratic function of the angle of attack $\alpha$ according to $$C_L = C_{L_0} + C_{L_\alpha}\alpha + C_{L_a}a + C_{L_{\delta_e}}\delta_e + C_{L_{\alpha^2}}\alpha^2 + \quad (89)$$
$$C_{L_{a\alpha}}a\alpha + C_{L_{\delta_e\alpha}}\delta_e\alpha + a^T C_{L_{a^2}}a + C_{L_{\delta_ea}}\delta_ea + C_{L_{\delta_e^2}}\delta_e^2$$

The drag coefficient can also be modeled as a quadratic function of the angle of attack $\alpha$, the virtual control vector a, and the elevator deflection $\delta_e$, or more generally as a quartic function of the angle of attack $\alpha$ according to $$C_D = C_{D_0} + C_{D_\alpha}\alpha + C_{D_a}a + C_{D_{\delta_e}}\delta_e + C_{D_{\alpha^2}}\alpha^2 + C_{D_{a\alpha}}a\alpha + \quad (90)$$
$$C_{D_{\delta_e\alpha}}\delta_e\alpha + a^T C_{D_{a^2}}a + C_{D_{\delta_ea}}\delta_ea + C_{D_{\delta_e^2}}\delta_e^2 + C_{D_{\alpha^3}}\alpha^3 + C_{D_{\alpha^4}}\alpha^4$$

In a similar fashion as the lift coefficient, the pitching moment coefficient can be represented by $$C_m = C_{m_0} + C_{m_\alpha}\alpha + C_{m_a}a + C_{m_{\delta_e}}\delta_e + C_{m_{\alpha^2}}\alpha^2 + \quad (91)$$
$$C_{m_{a\alpha}}a\alpha + C_{m_{a\delta_e}}\delta_e\alpha + a^T C_{m_{a^2}}a + C_{m_{\delta_ea}}\delta_ea + C_{m_{\delta_e^2}}\delta_e^2$$

In some embodiments, an online training set of random excitation signals are generated for the aerodynamic model identification of the estimates of $C_L$, $C_D$, and $C_m$ using the RLS parameter update laws in Eqs. (75)-(77). After a sufficient number of data sample, the estimates should converge toward the "true" values of $C_L$, $C_D$, and $C_m$ if the excitation signals are persistently exciting.

In some other embodiments, the excitation command signals for the virtual control variables $a_{n,j}$ can be generated by a preprogrammed schedule of values chosen based on the aircraft model information. The preprogrammed excitation signals are executed in two-sweep fashion: an initial sweep 400 and a directed sweep 500 as described previously. If $n_j=1$, then each of the virtual control variables $a_{n,j}$ is assigned a preprogrammed value as an excitation command signal.

If $n_j>1$, then either of the direct method approaches described above can be used. If the first approach is used, then each of the virtual control variables $a_{n,j}$ is assigned a preprogrammed value as an excitation command signal. If the second approach is used, then the virtual control variables $a_{n,n_j}=a_n$ are assigned preprogrammed valued as excitation command signals for the outermost segments of the multi-functional flight control surfaces 105. Then, the excitation command signals for the virtual control variables $a_n$, for the inner segments can be computed from a prescribed camber shape relationship as described above with respect to the direct method.

During the initial sweep cycle 400 for the aerodynamic model identification, an approximate surrogate model for $C_L$ given by:

$$\hat{C}_L = \hat{\bar{C}}_{L_0} + \hat{\bar{C}}_{L_\alpha}\alpha + \hat{\bar{C}}_{L_a}a + \hat{\bar{C}}_{L_{\alpha^2}}\alpha^2 + \hat{\bar{C}}_{L_{a\alpha}}a\alpha + a^T \hat{\bar{C}}_{L_a^2} a \quad (92)$$

is identified by the RLS parameter update laws in Eqs. (75)-(77).

During the directed sweep 500, the trim angle of attack for $C_L \bar{C}_L$ can be calculated as a function of the virtual control vector a as:

$$\alpha = -\frac{\hat{C}_{L_\alpha}\alpha + \hat{C}_{L_{a\alpha}}a}{2\hat{C}_{L_{\alpha^2}}}\left[1 - \sqrt{1 + \frac{4\hat{C}_{L_{\alpha^2}}(\hat{C}_L - \hat{C}_{L_0} - \hat{C}_{L_a}a - a^T\hat{C}_{L_a^2}a)}{(\hat{C}_{L_\alpha} + \hat{C}_{L_{a\alpha}}a)^2}}\right] \quad (93)$$

or $$\alpha \cong \frac{\hat{C}_L - \hat{C}_{L_0} - \hat{C}_{L_a}a - a^T\hat{C}_{L_a^2}a}{\hat{C}_{L_\alpha}} \quad (94)$$

if and $\hat{\bar{C}}_{L_a^2}$ are much smaller than $\hat{\bar{C}}_{L_\alpha}$.

During the directed sweep 500, the lift coefficient is maintained to be approximately equal to a given fixed lift coefficient of $\bar{C}_L$. Then, an approximate surrogate model for the trim drag coefficient is a function of the virtual control vector a only in the local region where $C_L = \bar{C}_L$, given by:

$$\hat{C}_D = \hat{\bar{C}}_{D_0} + \hat{\bar{C}}_{D_\alpha}\alpha(a) + \hat{\bar{C}}_{D_a}a + \hat{\bar{C}}_{D_{\alpha^2}}\alpha^2(a) + \hat{\bar{C}}_{D_{a\alpha}}a\alpha$$
$$(a) + a^T\hat{\bar{C}}_{D_a^2}a \quad (95)$$

Real-Time Drag Optimization

The real-time drag optimization method 130 of some embodiments uses the surrogate aerodynamic models to compute the optimal angle of attack and the deflections of the multi-functional flight control surfaces 105 represented by the actual or virtual control variables. A constrained adjoint-based optimization method is proposed as described in Subsection B of Section V of U.S. Provisional Patent Application No. 62/510,151, for example. The constraints enforced by the optimization describe the functional relationships of the aerodynamic lift and pitching moment coefficients and the dependency of the wing bending deflection and twist at the wing tip on the angle of attack and the actual or virtual control variables of the multi-functional flight control surfaces 105.

The first constraint involves selecting a desired value for the lift coefficient $C_{L_{opt}}$. Using the model of $C_L$ in Eq. (84) for the indirect method, the constraint is imposed as below:

$$C_{L_{opt}} - \hat{C}_{L_0} - \hat{C}_{L_\alpha}\alpha - \hat{C}_{L_a}a - \hat{C}_{L_{w_t}}w_t - \hat{C}_{L_{\theta_t}}\theta_t - \hat{C}_{L_{\delta_e}}\delta_e = 0 \quad (96)$$

The desired value of $C_{L_{opt}}$ may be the design cruise lift coefficient, for example.

The second constraint imposes a trim condition of zero total pitching moment, according to:

$$\hat{C}_m \bar{c} + \hat{C}_D z_e = 0 \quad (97)$$

with $\bar{c}$ being the mean aerodynamic chord and $z_e$ being the distance between the engine thrust line and the CG. In the second constraint, it is assumed that thrust is equal to drag.

The following relations exist for the third and fourth constraints, which relate the wing tip bending deflection and wing tip torsional twist to the angle of attack $\alpha$ and the virtual control vector a:

$$w_t - w_{t_0} - w_{t_\alpha}\alpha - w_{t_a}a = 0 \quad (98)$$

$$\theta_t - \theta_{t_0} - \theta_{t_\alpha}\alpha - \theta_{t_a}a = 0 \quad (99)$$

Each constraint equation is associated with an adjoint variable $\lambda_i$, i=1, 2, . . . , n. The optimization 130 computes the optimal solution for drag minimization in terms of the angle of attack and the deflections of the multi-functional flight control surfaces 105 as represented by the actual or virtual control variables using any suitable optimization method. Subsection B of Section V of U.S. Provisional Patent Application No. 62/510,151, for example, describes a second-order gradient or Newton-Raphson optimization method to compute the angle of attack and the virtual control variables of the multi-functional flight control surfaces 105 and solve the augmented drag optimization cost function. Using the Lagrange multipliers or adjoint variables $\lambda_i$, i=1, 2, 3, 4, the drag minimization cost function is given by:

$$J(\alpha, w_t, \theta_t, \delta_e, a) = \hat{C}_D + \quad (100)$$
$$\lambda_1\left(C_{L_{opt}} - \hat{C}_{L_0} - \hat{C}_{L_\alpha}\alpha - \hat{C}_{L_a}a - \hat{C}_{L_{w_t}}w_t - \hat{C}_{L_{\theta_t}}\theta_t - \hat{C}_{L_{\delta_e}}\delta_e\right) +$$
$$\lambda_2\left(\hat{C}_m \bar{c} + \hat{C}_D z_e\right) + \lambda_3(w_t - w_{t_0} - w_{t_\alpha}\alpha - w_{t_a}a) +$$
$$\lambda_4(\theta_t - \theta_{t_0} - \theta_{t_\alpha}\alpha - \theta_{t_a}a)$$

where $C_D$ may be modeled by Eq. (85) and $\hat{C}_m$ may be modeled by Eq. 86.

The Newton-Raphson method finds a solution to a cost function by recursively finding better approximations to the roots of a function ($\nabla J(x_n)=0$). The method starts with an initial guess $x_0$ for a root of the function. If the function satisfies the assumptions made in the derivation of the formula and the initial guess is close, then a better approximation is calculated in accordance with:

$$x_{n+1} = x_n - [\nabla^2 J(x_n)]^{-1} \nabla J(x_n) \quad (101)$$

where $\nabla J$ is the Jacobian and $\nabla^2 J$ is the Hessian of the cost function with respect to the design variables. This process is repeated until the design variables converge to a sufficiently accurate solution.

Assuming $\lambda_1 \ldots _4$, the augmented cost function can be solved with the Newton-Raphson method by rewriting Eq. 85 into the following equations:

$$\frac{\partial J}{\partial a} = \quad (102)$$
$$\left(\hat{C}_{D_a} + \hat{C}_{D_{a\alpha}}\alpha + 2a^T\hat{C}_{D_{a^2}} + \hat{C}_{D_{w_t}}w_t + \hat{C}_{D_{\theta_t}}\theta_t + \hat{C}_{D_{\delta_e}}\delta_e\right)(1+\lambda_2 z_e) -$$
$$\lambda_1 \hat{C}_{L_a} + \lambda_2 \hat{C}_{m_a}\bar{c} - \lambda_3 w_{t_a} - \lambda_4 \theta_{t_a} = 0$$

$$\frac{\partial J}{\partial \alpha} = \left(\hat{C}_{D_\alpha} + 2\hat{C}_{D_{\alpha^2}}\alpha + \hat{C}_{D_{a\alpha}}a + \hat{C}_{D_{w_t\alpha}}w_t + \hat{C}_{D_{\theta_t\alpha}}\theta_t + \hat{C}_{D_{\delta_e\alpha}}\delta_e\right) \quad (103)$$
$$(1 + \lambda_2 z_e) - \lambda_1 \hat{C}_{L_\alpha} + \lambda_2 \hat{C}_{m_\alpha}\bar{c} - \lambda_3 w_{t_\alpha} - \lambda_4 \theta_{t_\alpha} = 0$$

$$\frac{\partial J}{\partial w_t} = \left(\hat{C}_{D_{w_t}} + \hat{C}_{D_{w_t\alpha}}\alpha + \hat{C}_{D_{aw_t}}a + 2\hat{C}_{D_{w_t^2}}w_t + \hat{C}_{D_{\theta_t w_t}}\theta_t + \hat{C}_{D_{\delta_e w_t}}\delta_e\right) \quad (104)$$
$$(1 + \lambda_2 z_e) - \lambda_1 \hat{C}_{L_{w_t}} + \lambda_2 \hat{C}_{m_{w_t}}\bar{c} + \lambda_3 = 0$$

$$\frac{\partial J}{\partial \theta_t} = \left(\hat{C}_{D_{\theta_t}} + \hat{C}_{D_{\alpha\delta_e}}\alpha + \hat{C}_{D_{\theta_t a}}a + \hat{C}_{D_{\theta_t w_t}}w_t + 2\hat{C}_{D_{\theta_t^2}}\theta_t + \hat{C}_{D_{\delta_e\theta_t}}\delta_e\right) \quad (105)$$
$$(1 + \lambda_2 z_e) - \lambda_1 \hat{C}_{L_{\theta_t}} + \lambda_2 \hat{C}_{m_{\theta_t}}\bar{c} + \lambda_4 = 0$$

$$\frac{\partial J}{\partial \delta_e} = \left(\hat{C}_{D_{\delta_e}} + \hat{C}_{D_{\alpha\delta_e}}\alpha + \hat{C}_{D_{\delta_e a}}a + \hat{C}_{D_{\delta_e w_t}}w_t + \hat{C}_{D_{\delta_e \theta_t}}\theta_t + 2\hat{C}_{D_{\delta_e^2}}\delta_e\right) \quad (106)$$
$$(1 + \lambda_2 z_e) - \lambda_1 \hat{C}_{L_{\delta_e}} + \lambda_2 \hat{C}_{m_{\delta_e}}\bar{c} = 0$$

$$\frac{\partial J}{\partial \lambda_1} = C_{L_{opt}} - \hat{C}_{L_0} - \hat{C}_{L_\alpha}\alpha - \hat{C}_{L_a}a - \hat{C}_{L_{w_t}}w_t - \hat{C}_{L_{\theta_t}}\theta_t - \hat{C}_{L_{\delta_e}}\delta_e = 0 \quad (107)$$

$$\frac{\partial J}{\partial \lambda_2} = \hat{C}_m \bar{c} + \hat{C}_D z_e = 0 \quad (108)$$

$$\frac{\partial J}{\partial \lambda_3} = w_t - w_{t_0} - w_{t_\alpha}\alpha - w_{t_a}a = 0 \quad (109)$$

$$\frac{\partial J}{\partial \lambda_4} = \theta_t - \theta_{t_0} - \theta_{t_\alpha}\alpha - \theta_{t_a}a = 0 \quad (110)$$

Eqs. (108)-(110) are first solved for $\alpha$, $w_t$, and $\theta_t$, which are then substituted back in Eqs. (102)-(107) to eliminate their dependencies on $\alpha$, $w_t$, and $\theta t$. Eqs. (103)-(106) are solved next for the adjoint variables $\lambda_i$, i=1, 2, 3, 4 as a function of a and $\delta_e$ alone. Then, the resulting expressions for the adjoint variables $\lambda_i$, i=1, 2, 3, 4 are substituted back into Eqs. (102) and (106). The resulting Eqs. (102) and (106) are now only a function of a and $\delta_e$ alone. The Jacobian is then formed as $$\nabla J(x) = \left[\frac{\partial J}{\partial a}, \frac{\partial J}{\partial \delta_e}\right]^T \quad (111)$$

where $x=[a^T, \delta_e]^T$.
The Hessian is then evaluated as $$\nabla^2 J(x) = \begin{bmatrix} \frac{\partial^2 J}{\partial(aa^T)} & \frac{\partial^2 J}{\partial(\delta_e a^T)} \\ \frac{\partial^2 J}{\partial(a\delta_e)} & \frac{\partial^2 J}{\partial \delta_e^2} \end{bmatrix} \quad (112)$$

with $$\frac{\partial^2 J}{\partial(aa^T)} = 2\hat{C}_{D_{a^2}}(1+\lambda_2 z_e) \quad (113)$$

$$\frac{\partial^2 J}{\partial(\delta_e a^T)} = \hat{C}_{D_{\delta_e a}}^T(1+\lambda_2 z_e) \quad (114)$$

$$\frac{\partial^2 J}{\partial(a\delta_e)} = \hat{C}_{D_{\delta_e a}}(1+\lambda_2 z_e) \quad (115)$$

$$\frac{\partial^2 J}{\partial \delta_e^2} = 2\hat{C}_{D_{\delta_e^2}}(1+\lambda_2 z_e) \quad (116)$$

These equations can be readily modified for use with the actual control variables based on the direct signal generation method—for instance, by replacing the vector variable α with the vector variable δ in Eqs. (96)-(116)

Moreover, these equations can also be readily modified for use with the lift coefficient model in Eq. (89) and the pitching moment coefficient model in Eq. (91), which include a quadratic function of the angle of attack α, and the drag coefficient model in Eq. (90), which includes a quartic function of the angle of attack α. The cost function now only includes two adjoint variables $\lambda_1$ and $\lambda_2$ corresponding to the constraint equations (96) and (97), respectively.

Figure 8:
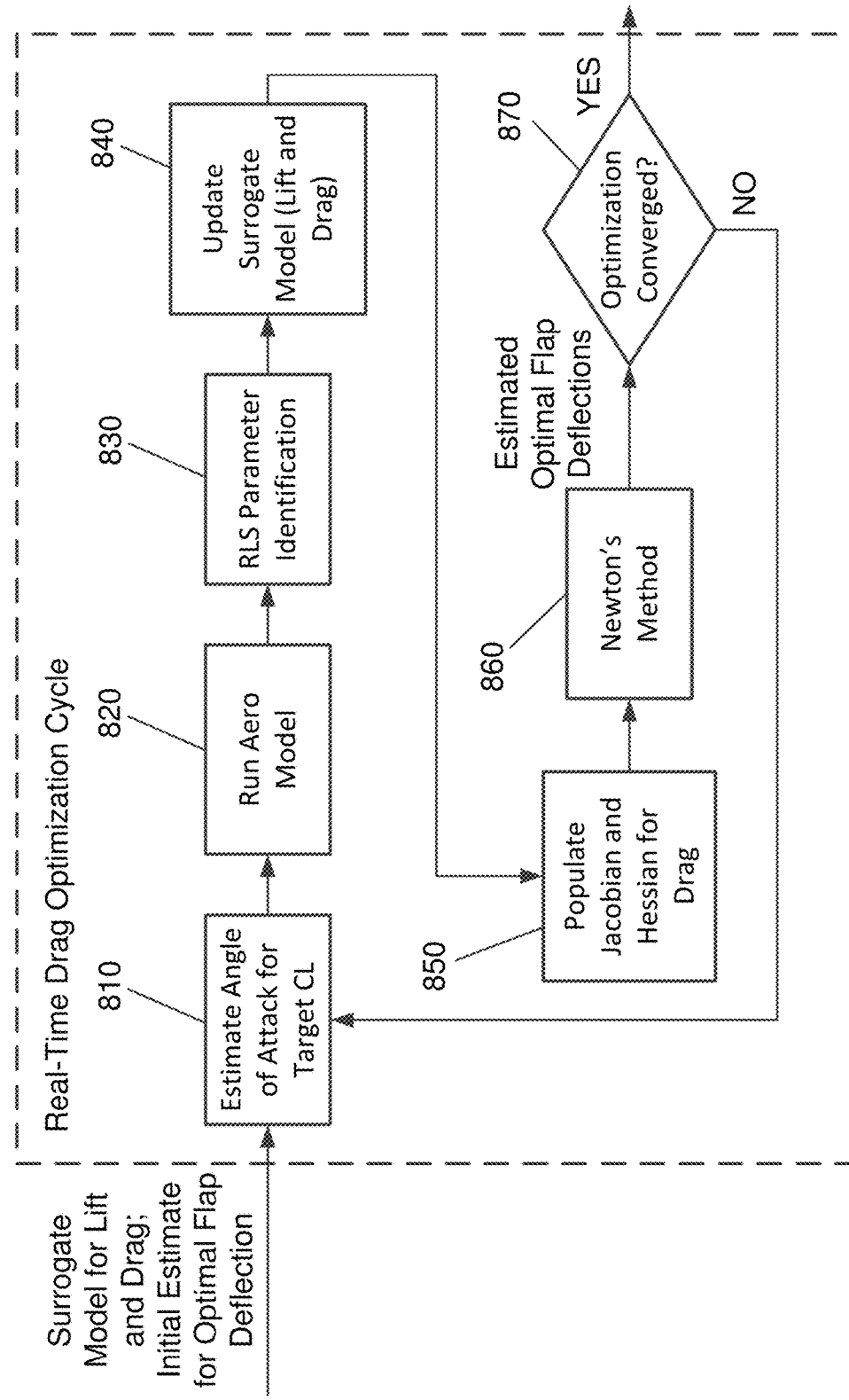
FIG. 8 is a flow diagram illustrating a real-time drag optimization cycle, according to an embodiment of the present invention.

Alternatively, in certain embodiments, a simplified optimization method can be used. A real-time drag optimization cycle 800 is shown in FIG. 8. At the start of the first optimization cycle, an initial "guess" for the optimal flap deflections is made, and steps 810, 820, 830, 840 are similar to steps 510, 520, 530, 540 of FIG. 5. Throughout the optimization process, the approximate surrogate model for $C_L$ in Eq. (64) is used to calculate a such that $\hat{C}_L = \overline{C}_L$. After obtaining the parameter estimates from the RLS algorithm at 830 based on the current test point and updating the surrogate models for lift and drag at 840, a Newton-Raphson second-order gradient optimization is performed to minimize $C_D$ represented by the cost function:

$$J(\delta) = \hat{C}_D \quad (117)$$

where $\hat{C}_D$ is described by the approximate surrogate model in Eq. (82).

The Jacobian and Hessian matrices for J(S) are formulated at 850 as:

$$\nabla J(\delta) = -\frac{\left(\hat{C}_{L_\delta}^T + 2\hat{C}_{L_{\delta^2}}\delta\right)\left(\hat{C}_{D_\alpha} + \hat{C}_{D_{\delta\alpha}}\delta + 2\hat{C}_{D_{\alpha^2}}\alpha\right)}{\hat{C}_{L_\alpha}} + \quad (118)$$
$$\hat{C}_{D_{\delta\alpha}}^T \alpha + \hat{C}_{D_\delta}^T + 2\hat{C}_{D_{\delta^2}}\delta$$

$$\nabla^2 J(\delta) = -\frac{\left(\hat{C}_{L_\delta}^T + 2\hat{C}_{L_{\delta^2}}\delta\right)\left(\hat{C}_{D_{\delta\alpha}}\hat{C}_{L_\alpha} - 2\hat{C}_{D_{\alpha^2}}\left(\hat{C}_{L_\delta} + 2\delta^T \hat{C}_{L_{\delta^2}}\right)\right)}{\hat{C}_{L_\alpha}^2} - \quad (119)$$
$$\frac{2\hat{C}_{L_{\delta^2}}\left(\hat{C}_{D_\alpha} + \hat{C}_{D_{\delta\alpha}}\delta + 2\hat{C}_{D_{\alpha^2}}\alpha\right)}{\hat{C}_{L_\alpha}} -$$
$$\frac{\hat{C}_{D_{\delta\alpha}}^T\left(\hat{C}_{L_\delta} + 2\delta^T \hat{C}_{L_{\delta^2}}\right)}{\hat{C}_{L_\alpha}} + 2\hat{C}_{D_{\delta^2}}$$

The Newton-Raphson second-order gradient optimization method is formulated at 860 using an iterative method as:

$$\delta_{j+1} = \delta_j - [\nabla^2 J(\delta_j)]^{-1} \nabla J(\delta_j) \quad (120)$$

The angle of attack α at each iteration is evaluated as:

$$\alpha_j = -\frac{\hat{C}_{L_\alpha} + \hat{C}_{L_{\delta\alpha}}\delta_j}{2\hat{C}_{L_{\alpha^2}}}\left[1 - \sqrt{1 + \frac{4\hat{C}_{L_{\alpha^2}}(\bar{C}_L - \hat{C}_{L_0} - \hat{C}_{L_\delta}\delta_j + \delta_j^T\hat{C}_{L_{\delta^2}}\delta_j)}{(\hat{C}_{L_\alpha} + \hat{C}_{L_{\alpha\delta}}\delta_j)^2}}\right] \quad (121)$$

where j is the index of the $j^{th}$ iteration.

Convergence criteria are applied at each iteration to check whether the optimization has converged at 870. The convergence criteria check for:

$$|C_{L_i} - \hat{C}_{L_i}| \leq \epsilon_L \quad (122)$$

$$|C_{D_i} - C_{D_{i-1}}| \leq \epsilon_D \quad (123)$$

$$\max|\delta_L - \delta_{i+1}| \leq \epsilon_\delta \quad (124)$$

$$C_{D_i} \leq C_{D_{min}}|_{C_L = \bar{C}_L} + \epsilon_G \quad (125)$$

The convergence criteria states that at the current time step i: (1) the optimization must be at a condition where $C_L$ is within the tolerance of $\bar{C}_L$ (for example, $C_L$ is within 1% of $\bar{C}_L$) (2) $C_D$ at the $i^{th}$ time step is within a tolerance of $C_D$ at the previous time step, indicating the minimum $C_D$ has approached a convergence (for example, $C_D$ is within 0.01 drag count); (3) The maximum change in optimal flap deflection for any flap section proposed for the next test point $\delta_{i+1}$ is within a tolerance of the current minimum (for example, the maximum change in the flap deflection is within 0.01° of the current flap deflection); and (4) $C_D$ at the $i^{th}$ time step is below the lowest $C_D$ recorded at $C_L = \bar{C}_L$ with a slight tolerance $\epsilon_G$ to allow for lift imprecision. If an optimization cycle converges by satisfying the convergence criteria prior to executing the number of specified test points in an optimization cycle, that optimization cycle is allowed to complete earlier.

Because the optimization process is an unconstrained optimization, additional steps are taken to prevent the optimization from resulting in a flap deflection that may exceed the maximum allowable settings in some embodiments. All the flap deflections may be constrained to be within a range between $\bar{\delta}_{min}$ and $\bar{\delta}_{max}$. If the proposed optimal flap deflection violates $\bar{\delta}_{min}$ and $\bar{\delta}_{max}$ at the i+1 time step, then for the individual flap section that violates the limits, the flap deflection in some embodiments is set to:

$$\delta_{i+1} = \begin{cases} \bar{\delta}_{max} - \Delta, & \delta_i > \bar{\delta}_{max} \\ \bar{\delta}_{min} + \Delta, & \delta_i < \bar{\delta}_{min} \end{cases} \quad (126)$$

where $\Delta$ can be set to be equal to 10, for example. The optimization is then modified to find the optimal values for the remaining flap deflections. Let $\delta = [\delta_u^T, \delta_c^T]^T$ where $\delta_u$ is a vector of the remaining flap deflections to be optimized and $\delta_c$ is a vector of the flap deflections constrained by Eq. (126). Then, the surrogate model for the drag coefficient is modified as $$\hat{C}_D = \hat{\bar{C}}_{D_0} + \hat{\bar{C}}_{D_\alpha}\alpha(\delta_u, \delta_c) + \hat{\bar{C}}_{D_{\alpha^2}}\alpha^2(\delta_u, \delta_c) + \hat{\bar{C}}_{D_{\delta_u}}\delta_u + \delta_u^T\hat{\bar{C}}_{D_{\delta_u^2}}\delta_u + \hat{\bar{C}}_{D_{\delta_c}}\delta_c + \delta_c^T\hat{\bar{C}}_{D_{\delta_c^2}}\delta_c + 2\delta_c^T\hat{\bar{C}}_{D_{\delta_c\delta_u}}\delta_u \quad (127)$$

Then, a similar optimization process as that described by Eqs. (118)-(121) can be formulated to minimize the cost function:

$$J(\delta_u) = \hat{C}_D \quad (128)$$

Thus, the simplified optimization method uses the simplified surrogate aerodynamic models. Because the simplified surrogate drag model is only a function of the deflections of the multi-functional flight control surfaces 105, the simplified optimization does not require the use of adjoint variables for constraint enforcement. Then, the optimization algorithm uses a second-order Newton-Raphson method to compute the optimal deflections of the multi-functional flight control surfaces 105 directly according to Eqs. (118)-(120). The optimal angle of attack is then computed directly from the simplified lift surrogate model according to Eq. (121). The simplified optimization method could be computationally more efficient than the optimization method of at least some other embodiments, but requires the lift coefficient to be close to the target lift coefficient. This would require the drag-excitation flight control system 110 to be designed to hold the flight path angle at zero degree and the altitude that corresponds to the target lift coefficient, and the online model identification 125 is performed whenever the flight path angle is near zero degree.

It should be understood that even though the simplified optimization method is formulated for use with the actual control vector δ, it can be readily and advantageously modified for use with the virtual control vector a in some other embodiments.

Iterative Refinement Optimization

The iterative refinement optimization 135 provides a refined optimal solution by iteratively performing a real-time drag optimization after each successive real-time drag optimization cycle is completed. Using the optimal solution identified by the previous real-time drag optimization cycle, the drag-excitation flight control system 110 and excitation command generator generate new excitation command in the local neighborhood of the optimal solution. An iterative refinement optimization 135 is performed next to improve the optimal solution. If the optimal solution converges, the iterative refinement optimization 135 terminates.

Figure 9:
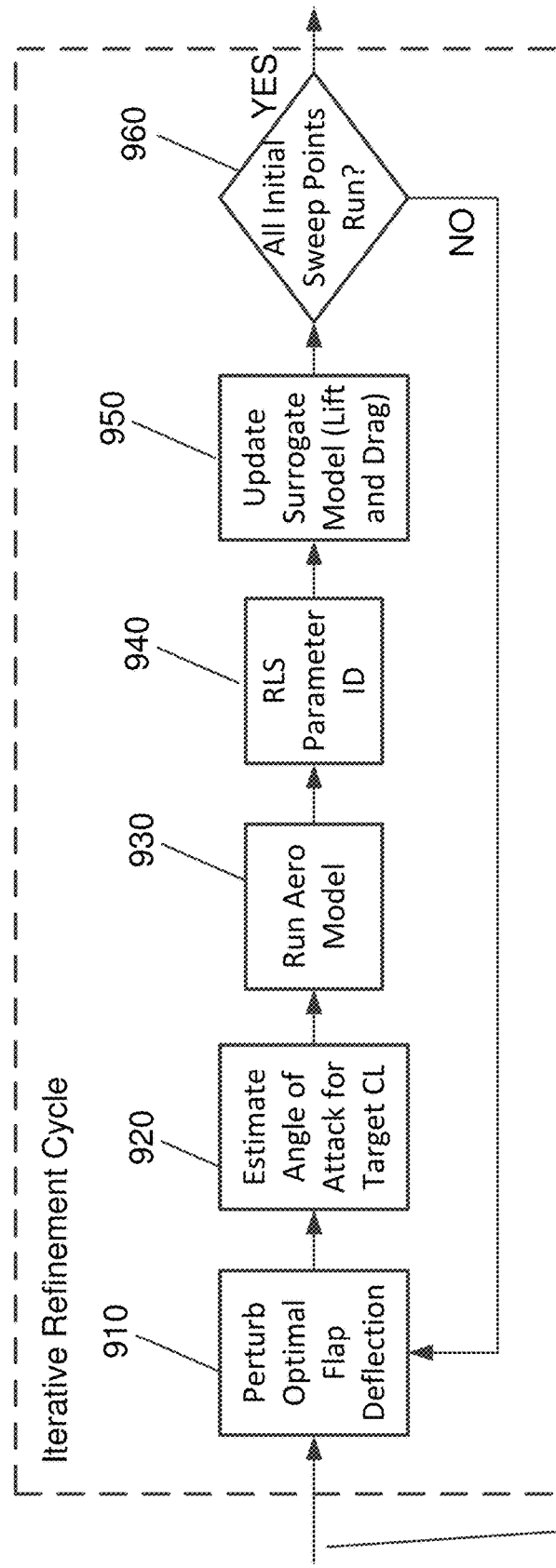
FIG. 9 is a flow diagram illustrating an iterative refinement cycle, according to an embodiment of the present invention.

Provided that the maximum number of optimization cycles has not been executed, the optimization process will enter an iterative refinement cycle in some embodiments, as shown in iterative refinement cycle 900 of FIG. 9. The objective of the iterative refinement cycle 900 is to perturb the flap deflections at 910 about the optimal flap deflection that has been identified by the optimization in order to locally improve the surrogate models for $C_L$ and $C_D$, which can further improve the accuracy of the optimal flap deflection. The iterative refinement cycle 900 runs for a fixed number of time steps, and randomly perturbs the flap sections, or perturb flap sections in a preprogrammed schedule, about the last calculated optimal flap deflection by a small perturbation Δδ. Steps 920, 930, 940, 950, 960 are similar to steps 510, 520, 530, 540, 550, respectively, of FIG. 5.

Multi-Functional Flight Control Surface State of Health (SOH) System

The multi-functional flight control surfaces 105 in some embodiments are equipped with a health state system 140 to provide the health state information. This health state system 140 determines through sensors whether the multi-functional flight control surfaces 105 are operational or inoperative (e.g., due to actuator failure). When they are operational, all of the deflections of the multi-functional flight control surfaces 105 are used in the real-time drag optimization framework 100. However, when some of the multi-functional flight control surfaces 105 are inoperative, the drag-excitation flight control system 110, excitation signal generator 115, online model identification 125, real-time drag optimization, and iterative refinement optimization 135 are modified to use the remaining operational multi-functional flight control surfaces 105. In particular, the drag-excitation flight control system 110 is modified to ensure the aircraft is in a level flight trim state. This can be accomplished by commanding the corresponding operational multi-functional flight control surfaces 105 on the other wing to have the same deflections as the inoperative multi-functional flight control surfaces.

In order to anticipate a possible flap actuator failure, an adjustment to the optimization process can be made such that the actuator failure does not cause the optimization to fail. In this case, the remaining flaps are active, but the failed flaps are assumed to be locked in place. A process 1000 for such an adjustment is shown in FIG. 10. Let $\delta_a$ be the flap deflection vector for all remaining functional flaps such that $\delta_a \subset \delta$ and $\delta_a = \delta$ in the case where all the flaps are functional. Then, $\delta_a$ is mapped to $\delta$ as:

$$\delta_a = G\delta \tag{129}$$

The deflections of the operational multi-functional flight control surfaces 105 above are used in the excitation signal generator 115, online model identification 125, real-time drag optimization 130, and iterative refinement optimization 135.

Then, the online model identification 125 and real-time drag optimization algorithms use an updated surrogate drag model. The simplified surrogate drag model for $C_D$ in Eq. (82) is updated at 1010 as:

$$\hat{C}_D = \hat{C}_{D_0}^* + \hat{C}_{D_\alpha}^* \alpha(G^T\delta) + \hat{C}_{D_{\delta\alpha}}^* G^T\delta + \hat{C}_{D_{\alpha^2}} \alpha^2(G^T\delta) + \hat{C}_{D_{\delta\alpha}} G^T \delta\alpha(G^T\delta) + \delta^T G^T G \hat{C}_{D_{\delta^2}} G^T G \delta \tag{130}$$

where the angle of attack $\alpha$ is a function of the operational multi-functional flight control surfaces according to:

$$\alpha \cong \frac{\hat{C}_L - \hat{C}_{L_0}^* - \hat{C}_{L_\delta}^* G^T G\delta - \delta^T G^T G \hat{C}_{L_{\delta^2}} G^T G\delta}{\hat{C}_{L_\alpha}^*} \tag{131}$$

and the asterisk symbols denote the lift and drag derivatives that include the contribution of the failed flaps.

The real-time drag optimization is then updated as in Eqs. (118)-(121) to minimize the cost function:

$$J(\delta_a) = \hat{C}_D \tag{132}$$

More specifically, the Jacobian and Hessian matrices are modified at 1020 as:

$$\nabla J(\delta_a) = -\frac{G(\hat{C}_{L_\delta}^{*T} + 2\hat{C}_{L_{\delta^2}} G^T\delta_a)(\hat{C}_{D_\alpha}^* + \hat{C}_{D_{\delta\alpha}} G^T\delta_a + 2\hat{C}_{D_{\alpha^2}} \alpha)}{\hat{C}_{L_\alpha}^*} + \tag{133}$$
$$G\hat{C}_{D_{\delta\alpha}}^T \alpha + G(\hat{C}_{D_\delta}^{*T} + 2\hat{C}_{D_{\delta^2}} G^T\delta_a)$$

$$\nabla^2 J(\delta_a) = -\frac{G(\hat{C}_{L_\delta}^{*T} + 2\hat{C}_{L_{\delta^2}} G^T\delta_a)\left[\hat{C}_{D_{\delta\alpha}} \hat{C}_{L_\alpha}^* - 2\hat{C}_{D_{\alpha^2}}(\hat{C}_{L_\delta}^* + 2\delta_a^T G \hat{C}_{L_{\delta^2}})G^T\right]}{\hat{C}_{L_\alpha}^{*2}} - \tag{134}$$
$$\frac{2G\hat{C}_{L_{\delta^2}} G^T(\hat{C}_{D_\alpha}^* + \hat{C}_{D_{\delta\alpha}} G^T\delta_a + 2\hat{C}_{D_{\alpha^2}} \alpha)}{\hat{C}_{L_\alpha}^*} - \frac{G\hat{C}_{D_{\delta\alpha}}^T(\hat{C}_{L_\delta}^* + 2\delta_a^T G \hat{C}_{L_{\delta^2}})G^T}{\hat{C}_{L_\alpha}^*} + 2G\hat{C}_{D_{\delta^2}} G^T$$

where all of the lift and drag sensitivity terms are still populated for all flaps, despite the failures. The Newton-Raphson second-order gradient optimization method is modified at 860 using an iterative method as:

$$\delta_{a,j+1} = \delta_{a,j} - [\nabla^2 J(\delta_{a,j})]^{-1} \nabla J(\delta_{a,j}) \tag{135}$$

The angle of attack is then calculated at 1030 as:

$$\alpha = -\frac{\hat{C}_{L_\alpha}^* + \hat{C}_{L_{\delta\alpha}} G^T \delta_a}{2\hat{C}_{L_{\alpha^2}}}\left[1 - \sqrt{1 + \frac{4\hat{C}_{L_{\alpha^2}}(\hat{C}_L - \hat{C}_{L_0} - \hat{C}_{L_\delta}^* G^T\delta_a - \delta_a^T G \hat{C}_{L_{\delta^2}} G^T\delta_a)}{(\hat{C}_{L_\alpha}^* + \hat{C}_{L_{\delta\alpha}}^* G^T\delta_a)^2}}\right] \tag{136}$$

The remaining active flaps are then controlled to achieve this new angle of attack at 1040.

Drag-Optimal Autopilot

The drag-optimal autopilot provides the ability to adjust the standard autopilot during cruise to achieve drag-optimal cruise. The adjustment to the autopilot is specified by the angle of attack and the deflections of the multi-objective flight control surfaces. This adjustment is provided by the real-time drag optimization 100 at the time instance when the real-time drag optimization is performed or at some time instance in the near future based on the aircraft flight condition at an airspeed and altitude.

A series of surrogate aerodynamic models can be identified throughout various flight phases at different airspeed and altitude. Once these surrogate models are identified, in addition to the real-time drag optimization, the drag optimization could also be performed in a non-real-time and predictive sense. Thus, if a standard autopilot is designed to specify an aircraft altitude and airspeed along a cruise profile, then a schedule of the optimal angle of attack and deflections of the multi-functional flight control surfaces 105 can be computed by the non-real-time drag optimization algorithm. This schedule is then used to adjust the autopilot to provide commands to the aircraft flight control system to achieve a drag-optimal cruise.

The purpose of the drag-optimal autopilot is to minimize drag in cruise by scheduling changes in the angle of attack and the deflections of the multi-functional flight control surfaces 105 advantageously according to the real-time drag optimization framework 100.

Typically, an aircraft wing is designed to operate optimally at a specific gross weight, called design or mid-cruise gross weight, which includes 50% of the total fuel stored in the aircraft. The fuel weight could account for about 40% of aircraft operational empty weight. For example, a Boeing 757 may have a mid-cruise weight of 210,000 lbs, and could carry as much as 75,000 lbs of fuel.

As the fuel is burned, the aircraft lift coefficient changes due to changes in the aircraft gross weight as well as changes in the wing aeroelastic deflection as most of the fuel is stored inside the aircraft wing structure. Therefore, the angle of attack and the deflections of the multi-functional flight control surfaces are scheduled to change as the fuel is burned. A guidance law for the drag-optimal autopilot can be developed to schedule the angle of attack and the deflections of the multi-functional flight control surfaces as a function of the fuel weight.

Consider a constant altitude and constant airspeed cruise in some embodiments. The trim lift coefficient is a function of the fuel weight according to $$\overline{C}_L = \frac{W_a + fW_f}{q_\infty S} \tag{137}$$

where $W_a$ is the aircraft gross weight excluding fuel, $W_f$ is the total fuel weight, f is the fuel weight fraction which varies from 0 corresponding to empty fuel and 1 corresponding to full fuel, and $q_\infty$ is the dynamic pressure which is constant for a constant altitude and constant airspeed cruise.

The aircraft gross weight corresponding to f=0.5 is generally considered to be the design mid-cruise gross weight at which the wing is supposed to be aerodynamically optimal. At any other value of f, the angle of attack and deflections can be computed by the real-time drag optimization framework 100 by specifying the trim lift coefficient as the target lift coefficient, for example, $C_{L_{opt}} = \overline{C}_L$ in Eq. (100) of the real-time drag optimization method 130.

The real-time drag optimization framework 100 computes the optimal angle of attack and deflections of the multi-functional flight control surfaces 105 that minimizes drag while satisfying the lift constraint that takes into account wing aeroelasticity. Therefore, the trim lift coefficient can generally be obtained as $$\overline{C}_L = C_{L_{opt}}(\alpha_{opt}, \delta_{opt}, \delta_{e,opt}, w_{t,opt}, \theta_{t,opt}) \tag{138}$$

where the subscript opt denotes the optimal values obtained from the real-time drag optimization framework 100 corresponding to the minimum drag condition $$\overline{C}_D = C_{D_{min}}(\alpha_{opt}, \delta_{opt}, \delta_{e,opt}, w_{t,opt}, \theta_{t,opt}) \tag{139}$$

Thus, the guidance law for the drag-optimal autopilot computes the trim lift requirement using the fuel weight information and send it to the real-time drag optimization framework 100. Then, the framework 100 computes the optimal angle of attack and deflections of the multi-functional flight control surfaces 105. This information is then sent to the angle of attack command drag-excitation flight control system 110 which generates the required optimal angle of attack and deflections of the multi-functional flight control surfaces 105.

Consider another type of cruise: constant altitude and maximum ML/D cruise in some embodiments. The Breguet range equation is given by $$r = -\int_{W_s}^{W_e} \left(\frac{a}{c}\right)\left(\frac{ML}{D}\right)\frac{dW}{W} \tag{140}$$

where r is the cruise range of the aircraft from the starting gross weight $W_s$ to the ending gross weight $W_e$, a is the speed of sound which is constant with altitude, c is the thrust specific fuel consumption, M is the Mach number, L is the lift, D is the drag, and W is the instantaneous gross weight.

The quantity ML/D can be maximized in order to maximize the cruise range by the real-time drag optimization framework 100. This can be expressed as $$\frac{ML}{D} = \frac{MC_L}{C_D} \tag{141}$$

The objective of the real-time drag optimization framework 100 is to maximize the quantity ML/D. This can be accomplished by conducting real-time drag optimization for several selected airspeed and constant altitude by changing the airspeed, hence Mach number, at cruise. At each Mach number, the optimal angle of attack and deflections of the multi-functional flight control surfaces 105 are computed by the real-time drag optimization framework 100. Then, from the optimal results for various Mach numbers, the maximum value of ML/D can be estimated. This results in $$\left(\frac{ML}{D}\right)_{max} = \frac{M_{opt} C_{L_{opt}}(M_{opt}, \alpha_{opt}, \delta_{opt}, \delta_{e,opt}, w_{t,opt}, \theta_{t,opt})}{C_{D_{min}}(M_{opt}, \alpha_{opt}, \delta_{opt}, \delta_{e,opt}, w_{t,opt}, \theta_{t,opt})} \tag{142}$$

where $M_{opt}$ is computed from $$M_{opt} = \sqrt{\frac{2(W_a + fW_f)}{C_{L_{opt}} kpS}} \tag{143}$$

where p is the atmospheric pressure as a function of the altitude and k is the specific heat constant, which is equal to 1.4 for air.

Thus, the guidance law for the drag-optimal autopilot for the constant altitude and maximum ML/D cruise sends the optimal Mach number command first to an airspeed command flight control system which changes the airspeed via engine thrust control. Then, the guidance law sends the optimal angle of attack and the deflections of the multi-functional flight control surfaces 105 to the angle of attack command drag-excitation flight control system 110 which generates the required optimal angle of attack and deflections of the multi-functional flight control surfaces 105 once the optimal Mach number is reached.

Consider another type of cruise: constant airspeed and maximum L/D cruise in some embodiments. The Breguet range equation is given by $$r = -\int_{W_s}^{W_e} \left(\frac{V}{c}\right)\left(\frac{L}{D}\right)\frac{dW}{W} \tag{144}$$

where V is the airspeed which is constant, but the altitude, hence Mach number, can change with this type of cruise.

The objective of the real-time drag optimization framework 100 is to maximize the quantity L/D. This can be accomplished by conducting real-time drag optimization for several selected trim lift coefficients $\overline{C}_L$. At each trim coefficient, the optimal angle of attack and deflections of the multi-functional flight control surfaces 105 are computed by the real-time drag optimization framework 100. Then, from the optimal results for various trim lift coefficients $\overline{C}_L$, the maximum value of L/D can be estimated. This results in $$\left(\frac{L}{D}\right)_{max} = \frac{C_{L_{opt}}(M_{opt}, \alpha_{opt}, \delta_{opt}, \delta_{e,opt}, w_{t,opt}, \theta_{t,opt})}{C_{D_{min}}(M_{opt}, \alpha_{opt}, \delta_{opt}, \delta_{e,opt}, w_{t,opt}, \theta_{t,opt})} \quad (145)$$

Since the airspeed is maintained constant during cruise, to meet the optimal trim lift coefficient $C_{L_{opt}}$, a change in the altitude is required and can be computed from the atmospheric density according to $$\rho(h_{opt}) = \sqrt{\frac{2(W_a + fW_f)}{C_{L_{opt}}VS}} \quad (146)$$

where ρ is the atmospheric density from which the optimal cruising altitude $h_{opt}$ can be computed.

Thus, the guidance law for the drag-optimal autopilot for the constant airspeed and maximum L/D cruise sends the optimal cruising altitude command first to an altitude command flight control system to change the altitude of the aircraft. Then, the guidance law sends the optimal angle of attack and the deflections of the multi-functional flight control surfaces 105 to the angle of attack command drag-excitation flight control system 110 which generates the required optimal angle of attack and deflections of the multi-functional flight control surfaces 105 once the optimal cruising altitude is reached.

FIG. 11 is a block diagram illustrating a computing system 1100 configured to perform real-time drag optimization control for wing structures, according to an embodiment of the present invention. In some embodiments, system 1100 may be, or may be integrated with, the flight control system of an aircraft. System 1100 includes a bus 1105 or other communication mechanism for communicating information, and processor(s) 1110 coupled to bus 1105 for processing information. Processor(s) 1110 may be any type of general or specific purpose processor, including a central processing unit (CPU) or application specific integrated circuit (ASIC). Processor(s) 1110 may also have multiple processing cores, and at least some of the cores may be configured for specific functions. System 1100 further includes a memory 1115 for storing information and instructions to be executed by processor(s) 1110. Memory 1115 can be comprised of any combination of random access memory (RAM), read only memory (ROM), flash memory, cache, static storage such as a magnetic or optical disk, or any other types of non-transitory computer-readable media or combinations thereof. Additionally, system 1100 includes a communication device 1120, such as a transceiver, to wirelessly provide access to a communications network.

Non-transitory computer-readable media may be any available media that can be accessed by processor(s) 1110 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 1110 are further coupled via bus 1105 to actuators 1125 that control flaps of an aircraft. As computing system computes new drag optimization solutions, respective actuators 1125 for one or more of the flaps may be controlled. In this manner, drag may be reduced during flight based on actual flight conditions rather than merely based on a lookup-table. Sensor information from sensors 1130 may be used to determine parameters including, but not limited to, drag, lift, pitching moment, and wing deflections.

Memory 1115 stores software modules that provide functionality when executed by processor(s) 1110. The modules include an operating system 1135 for system 1100. The modules further include a real-time drag optimization module 1140 that is configured to perform the various real-time drag control processes disclosed herein. System 1100 may include one or more additional functional modules 1145 that include additional functionality.

One skilled in the art will appreciate that a "system" could be any suitable avionics system for an aircraft, or a remote computing system, such as a personal computer, a server, a console, a personal digital assistant (PDA), a cell phone, a tablet computing device, or any other suitable computing device, or combination of devices, that is configured to control the aircraft remotely. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 1, 4, 5, and 8-10 may be performed by a computer program, encoding instructions for a processor(s) to perform at least the processes described in FIGS. 1, 4, 5, and 8-10, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. The computer program may include encoded instructions for controlling the processor(s) to implement the processes described in FIGS. 1, 4, 5, and 8-10, which may also be stored on the computer-readable medium.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A computer-implemented aerodynamic optimization method, comprising:
   causing, by a computer system, a plurality of flap sections of an aircraft to deflect, each of the flap sections deflecting in accordance with excitation signals generated by an excitation signal generator, the excitation signals generated by a sweep method or a random excitation method;
   receiving, from at least one sensor, sensor signals reflecting one or more changes in drag, lift, pitching moment, wing aeroelastic bending deflection and twist that were generated by the flap section deflections; and
   generating one or more aerodynamic models by performing online model identification using at least the sensor signals from the at least one sensor.

2. The computer-implemented method of claim 1, wherein the online model identification comprises:
   receiving, by the computing system, the excitation signals generated by the excitation signal generator and the sensor signals from the at least one sensor resulting from aerodynamic effects of the flap section deflections;
   generating surrogate aerodynamic models for aircraft lift, drag, and pitching moment as functions of:
      an aircraft angle of attack,
      actual or virtual control variables of the flap sections,
      wing bending deflection, and
      twist at a wing tip
   that are reflected in the received excitation signals and sensor signals, wherein the generating step uses a direct or an indirect method;
   updating an estimated model based on the computed surrogate aerodynamic models; and
   repeating the receiving, generating, and updating over a plurality of cycles until a truth model and the estimated model converge within a tolerance to produce a converged model.

3. The computer-implemented method of claim 1, further comprising:
   controlling flight control surfaces of the aircraft based on the converged model, by the computing system, to improve aerodynamic performance during flight.

4. The computer-implemented method of claim 1, wherein the online model identification includes accounting for changes in flight conditions and aircraft performance based on altitude, airspeed, fuel weight, a number of passengers, locations of the passengers, cargo loading, or any combination thereof.

5. The computer-implemented method of claim 1, further comprising: compiling converged models for one or more different flight conditions, by the computing system;
   selecting a converged model from the compiled converged models for a current flight condition, by the computing system, when the converged model matches parameters comprising altitude, airspeed, gross weight, or any combination thereof, within a predetermined tolerance; and
   controlling control surfaces of the aircraft for the current flight condition based on the selected converged model, by the computing system.

6. The computer-implemented method of claim 5, wherein once the aircraft has operated for a first predetermined amount of time, the online model identification is bypassed, and the flaps are controlled exclusively based on the compiled converged models.

7. The computer-implemented method of claim 6, wherein once the aircraft has operated for second predetermined amount of time after the first predetermined amount of time, the method further comprises:
further performing a second online model identification, by the computing system, to produce new converged models based on the aircraft's current age and current condition.

8. The computer-implemented method of claim 5, further comprising:
further performing a second online model identification, by the computing system, when no previously generated converged model fits a given situation based on altitude, airspeed, fuel weight, a number of passengers, locations of the passengers, cargo loading, or any combination thereof.

9. The computer-implemented method of claim 1, wherein the online model identification includes accounting for aeroelastic wing structures of the aircraft by accounting for wing tip bending and wing tip twist.

10. The computer-implemented method of claim 1, wherein each flap section is restricted in movement due to structural properties of transition materials or to maintain a gradual stepwise smooth variation in the flap deflections between adjoint flap sections.

11. The computer-implemented method of claim 1, wherein the online model identification comprises using virtual control variables prescribed by a mathematical shape function to parameterize actual control signals to reduce a number of control variables.

12. The computer-implemented method of claim 1, wherein a dependency on wing aeroelastic deflection variables is implicitly accounted for or eliminated such that only state information of the aircraft is used without explicitly accounting for wing aeroelastic deflection.

13. The computer-implemented method of claim 1, wherein the excitation signals are generated either using a direct method based on the actual control variables, or an indirect method based on the virtual command variables.

14. The computer-implemented method of claim 1, wherein the one or more sensors comprise an engine thrust measurement sensor, a load sensor, accelerometers, a strain gauge rosette, velocity transducers, or any combination thereof.

15. The computer-implemented method of claim 1, wherein convergence is determined by a constrained adjoint-based optimization method using a Newton-Raphson method.

16. The computer-implemented method of claim 1, wherein when at least one flap section is inoperative, the method further comprises:
modifying the excitation signal generation, the online model identification, realtime drag optimization, and iterative refinement optimization to account for the at least one inoperative flap section using remaining, operative flap sections.

17. A system, comprising:
memory storing computer program code for performing aerodynamic optimization; and
at least one processor, wherein the at least one processor, by executing the computer program code, is configured to:
cause a plurality of flap sections of an aircraft to deflect, each of the flap sections deflecting in accordance with excitation signals generated by an excitation signal generator, the excitation signals generated by a sweep method or a random excitation method,
receive, from at least one sensor, sensor signals reflecting one or more changes in drag, lift, pitching moment, wing aeroelastic bending deflection and twist that were generated by the flap section deflections,
generate one or more aerodynamic models by performing online model identification using at least the sensor signals from the at least one sensor, and
control flight control surfaces of the aircraft based on a converged model, by the computing system, to improve aerodynamic performance during flight.

18. The system of claim 17, wherein the online model identification comprises:
receiving the excitation signals generated by the excitation signal generator and the sensor signals from the at least one sensor resulting from aerodynamic effects of the flap section deflections;
generating surrogate aerodynamic models for aircraft lift, drag, and pitching moment as functions of:
an aircraft angle of attack,
actual or virtual control variables of the flap sections,
wing bending deflection, and
twist at a wing tip
that are reflected in the received excitation signals and sensor signals, wherein the generating step uses a direct or an indirect method;
updating an estimated model based on the computed surrogate aerodynamic models;
and
repeating the receiving, generating, and updating over a plurality of cycles until a truth model and the estimated model converge within a tolerance to produce a converged model.

19. A computer program embodied on a non-transitory computer-readable storage medium, the program configured to cause at least one processor to:
receive excitation signals generated by an excitation signal generator and sensor signals from at least one sensor resulting from aerodynamic effects of deflections of flap sections of an aircraft;
generate surrogate aerodynamic models for aircraft lift, drag, and pitching moment as functions of:
an aircraft angle of attack,
actual or virtual control variables of the flap sections,
wing bending deflection, and
twist at a wing tip
that are reflected in the received excitation signals and sensor signals, wherein the step to generate surrogate aerodynamic models uses a direct or an indirect method;
update an estimated model based on the computed surrogate aerodynamic models;
and
repeat the receiving, generating, and updating over a plurality of cycles until a truth model and the estimated model converge within a tolerance to produce a converged model.

20. The computer program of claim 19, wherein the program is further configured to cause the at least one processor to:
compile converged models for one or more different flight conditions;
select a converged model from the compiled converged models for a current flight condition when the converged model matches parameters comprising altitude, airspeed, gross weight, or any combination thereof, within a predetermined tolerance; and controlling control surfaces of the aircraft for the current flight condition based on the selected converged model, by the computing system.

\* \* \* \* \*